(12) United States Patent
Asbury et al.

(10) Patent No.: US 6,983,947 B2
(45) Date of Patent: Jan. 10, 2006

(54) BICYCLE TOWING DEVICE

(76) Inventors: Scott Guy Asbury, 221 Garden La., Sarasota, FL (US) 34242; Edward Scott Nelson, 103 11th St. South, Bradenton Beach, FL (US) 34217

( * ) Notice: Subject to any disclaimer, the term of this patent is extended or adjusted under 35 U.S.C. 154(b) by 301 days.

(21) Appl. No.: 10/725,915

(22) Filed: Dec. 1, 2003

(65) Prior Publication Data

US 2004/0145147 A1 Jul. 29, 2004

Related U.S. Application Data

(63) Continuation of application No. 09/381,117, filed as application No. PCT/US98/04810 on Mar. 10, 1998, now abandoned.
(60) Provisional application No. 60/039,938, filed on Mar. 10, 1997.

(51) Int. Cl.
*B62K 27/00* (2006.01)

(52) U.S. Cl. ............... 280/204; 280/239; 280/292
(58) Field of Classification Search ............... 280/204, 280/239, 292
See application file for complete search history.

(56) References Cited

U.S. PATENT DOCUMENTS

| | | | | |
|---|---|---|---|---|
| 605,799 | A | * 6/1898 | Ripley | 280/292 |
| 3,877,723 | A | * 4/1975 | Fahey et al. | 280/204 |
| 4,261,592 | A | 4/1981 | Busseuil | |
| 5,003,912 | A | 4/1991 | Thurston | |
| 5,067,738 | A | 11/1991 | O'Connor | |
| 5,454,578 | A | 10/1995 | Neack | |
| 5,470,088 | A | * 11/1995 | Adams | 280/204 |
| 5,743,543 | A | 4/1998 | Chiu | |
| 5,842,710 | A | * 12/1998 | Couture | 280/204 |
| 5,860,662 | A | 1/1999 | Bartoshesky et al. | |
| 6,155,582 | A | 12/2000 | Bourbeau | |
| 6,286,847 | B1 | 9/2001 | Perrin | |
| 6,561,533 | B2 | 5/2003 | Snobl | |

FOREIGN PATENT DOCUMENTS

| | | |
|---|---|---|
| DE | 88-06-126 U | 7/1988 |
| DE | 92-11-422 U | 2/1993 |
| DE | 195-31-503 A | 3/1996 |
| FR | 872374 A | 6/1942 |
| FR | 1077941 A | 11/1954 |
| FR | 2507145 A | 12/1982 |

OTHER PUBLICATIONS

Lynx Owner's Manual 16 Model, Danville, CA 94526 (3 pages).
Advertisement for Lynx Tandem Converter, p. 60.
Advertisement for Lynx Tandem Converter, Bicycling Magazine, (May 1996) p. 127.
PCT International Search Report for International Application No. PCT/US/98/04810 Oct. 23, 1998.
Supplementary European Search Report for European Application No. EP 98 91 1585 Nov. 7, 2000.

* cited by examiner

*Primary Examiner*—Daniel G. DePumpo
(74) *Attorney, Agent, or Firm*—Hahn Loeser & Parks, LLP; Robert J. Clark

(57) ABSTRACT

A bicycle towing device which is positioned between a tow bicycle, such as an adult bicycle, and a towed bicycle, such as a child's bicycle, and enables the towed bicycle to function as a one wheeled bicycle trailed behind the tow bicycle. The bicycle towing device in accordance with the present invention enables the towing of an intact and ridable towed bicycle behind the tow bicycle by lifting the front wheel of the towed bicycle off the ground and, if desired, the towed bicycle can be pedaled while it is being towed by the tow bicycle. When not in use, the bicycle towing device in accordance with the present invention is capable of being collapsed and stored on the tow bicycle. When it is desired to operate the towed bicycle in a one wheeled bicycle trailed mode, the bicycle towing device is capable of being removed from its stored position on the tow bicycle, extended and quickly and easily attached to the towed bicycle such that the towed bicycle can be ridden as a one wheeled bicycle trailer behind the tow bicycle.

16 Claims, 10 Drawing Sheets

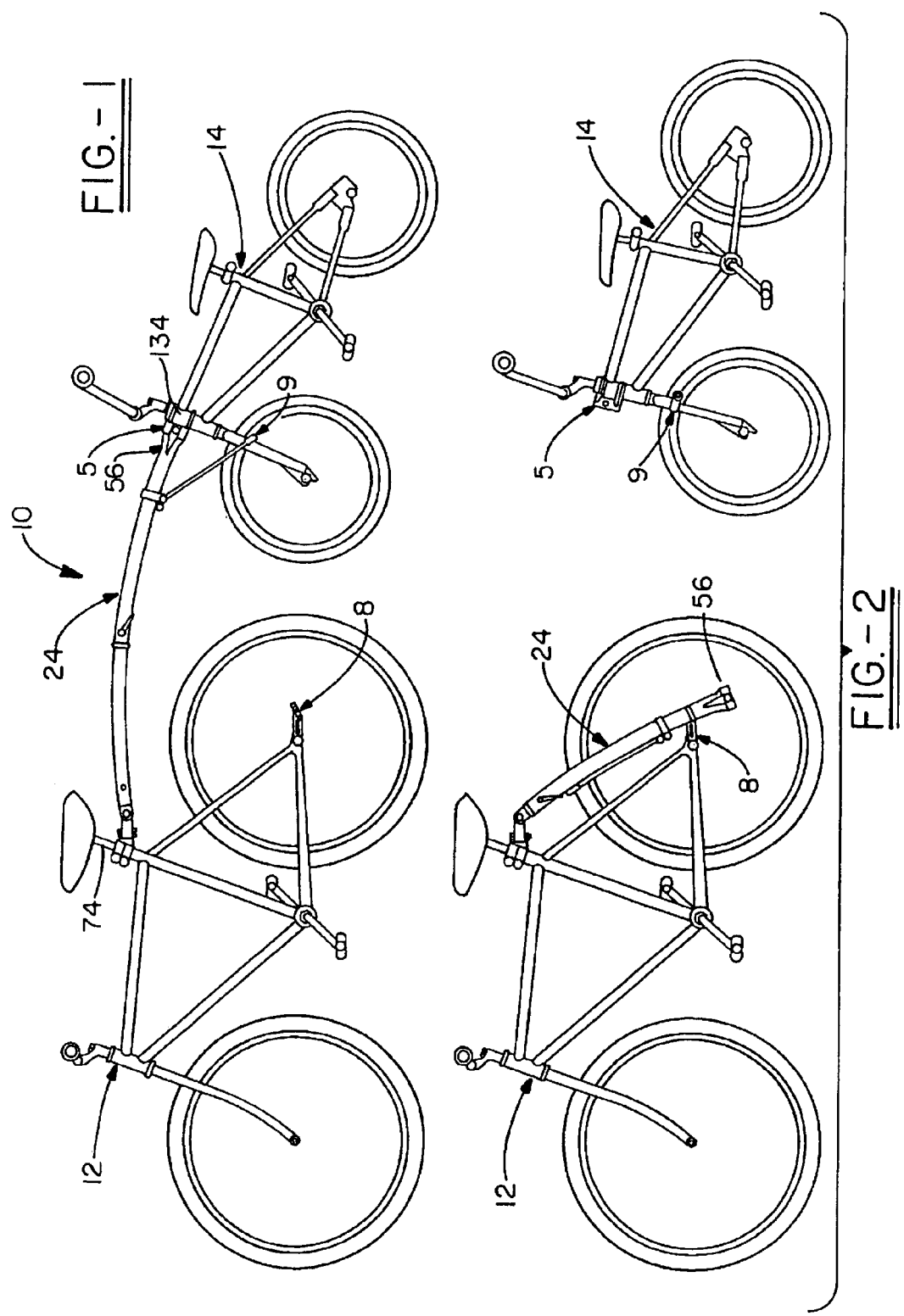

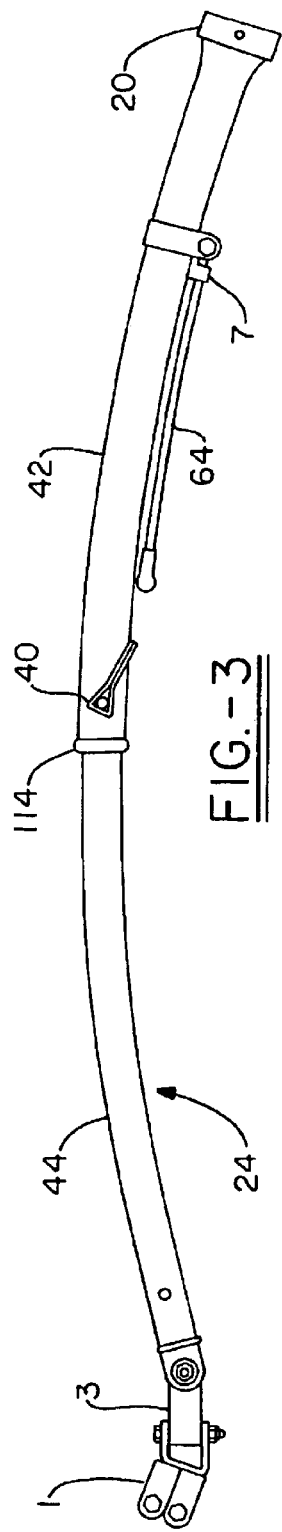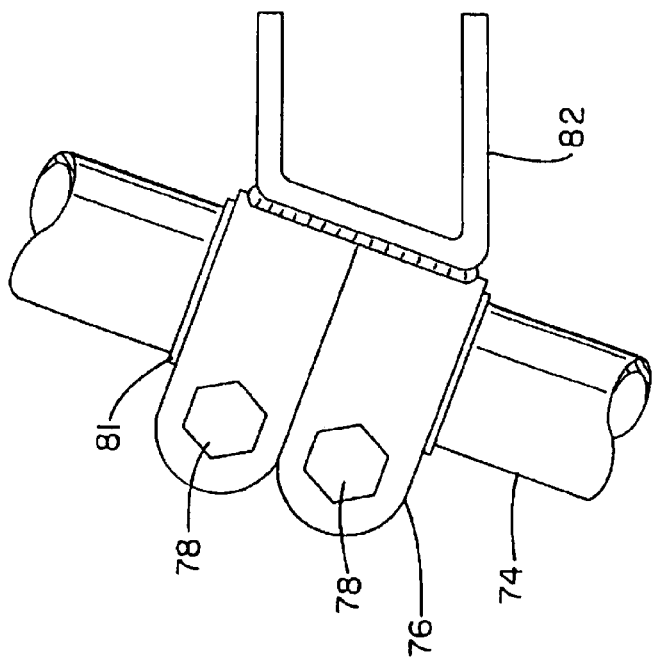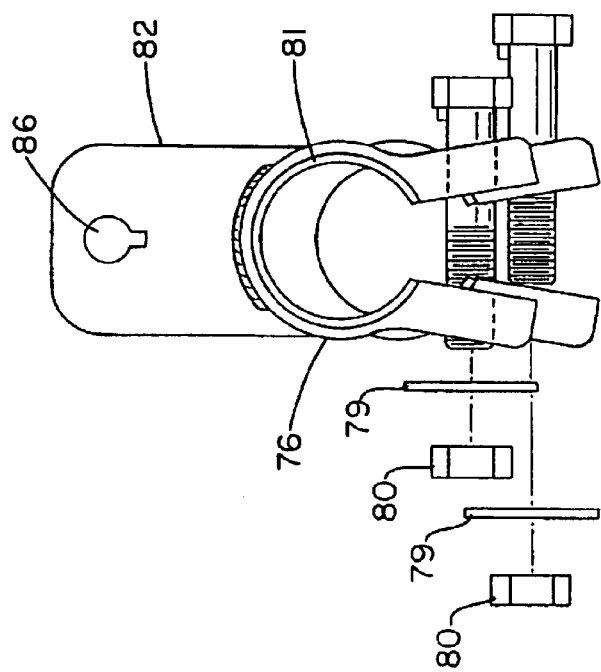

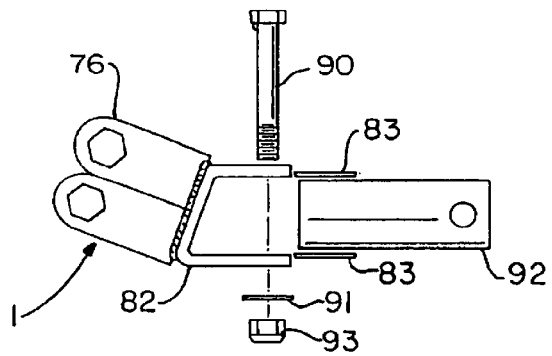
FIG.-5A
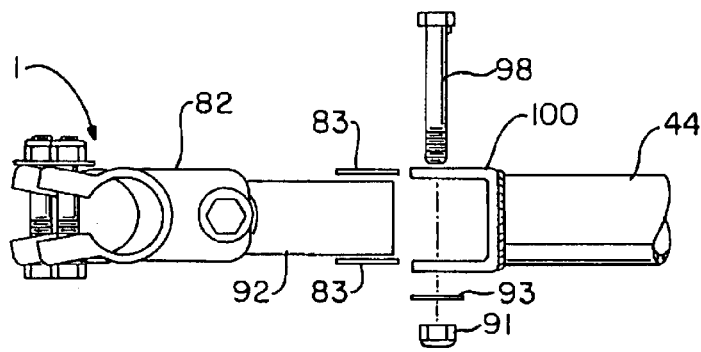
FIG.-5B
FIG.-5C
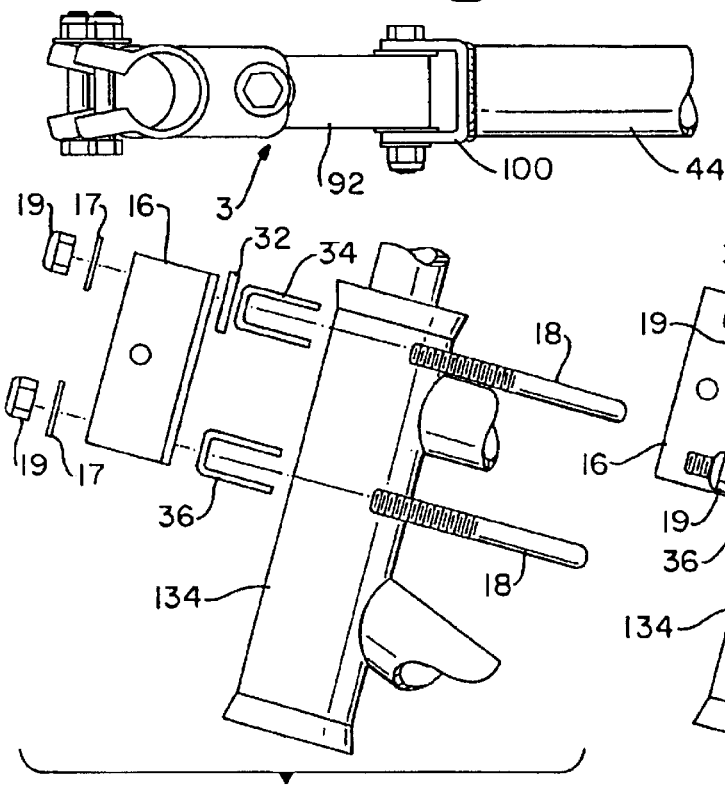
FIG.-6A
FIG.-6B

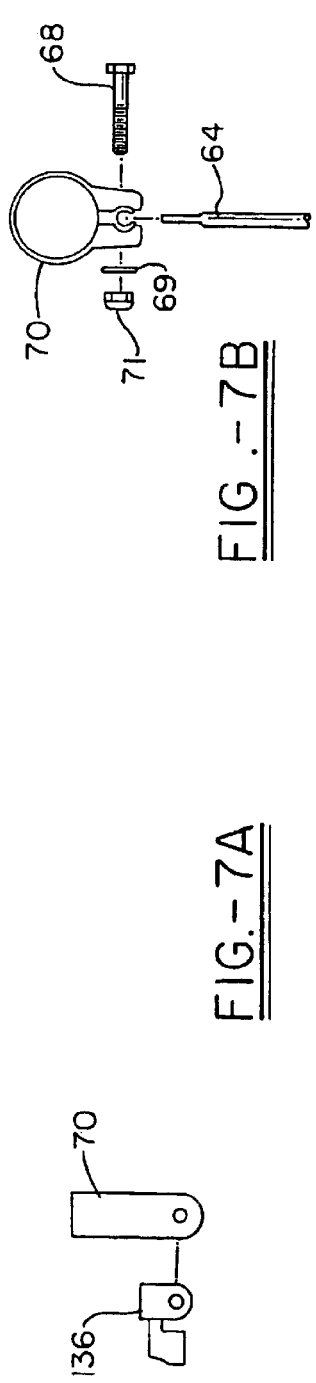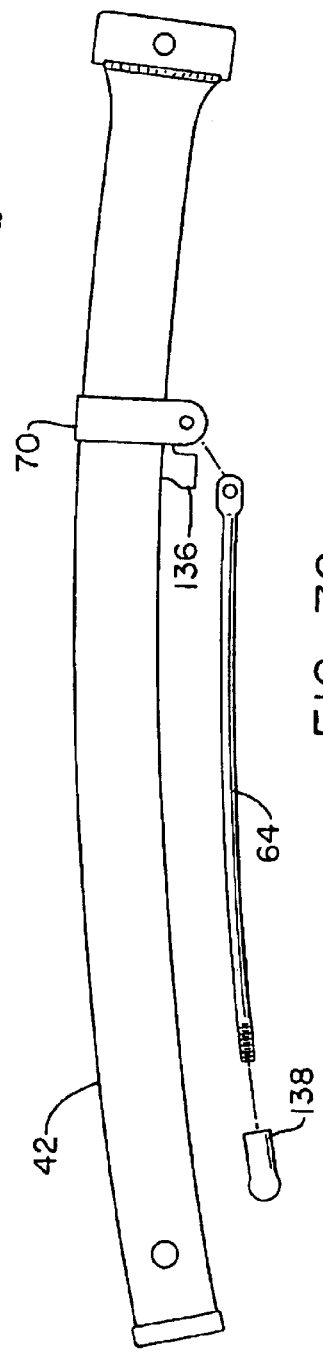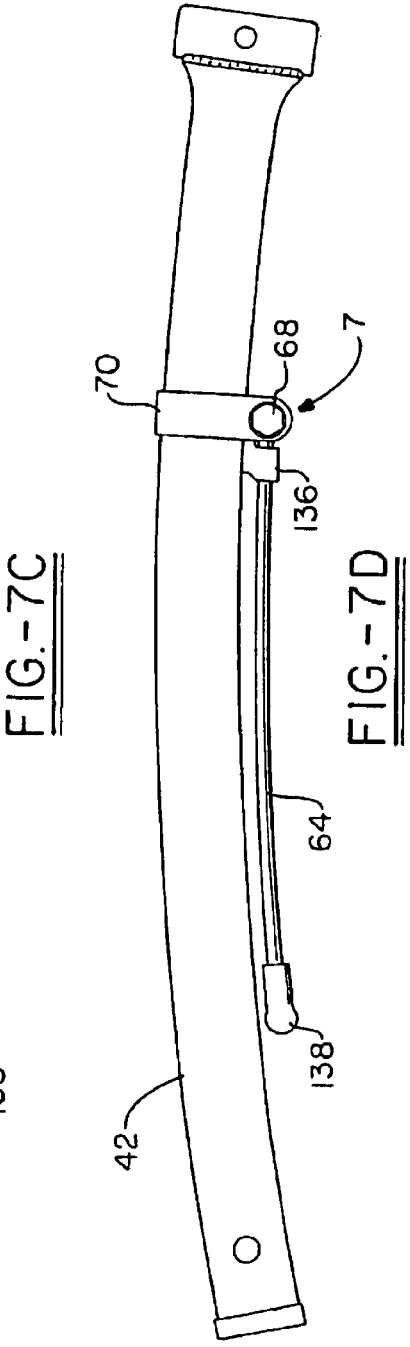

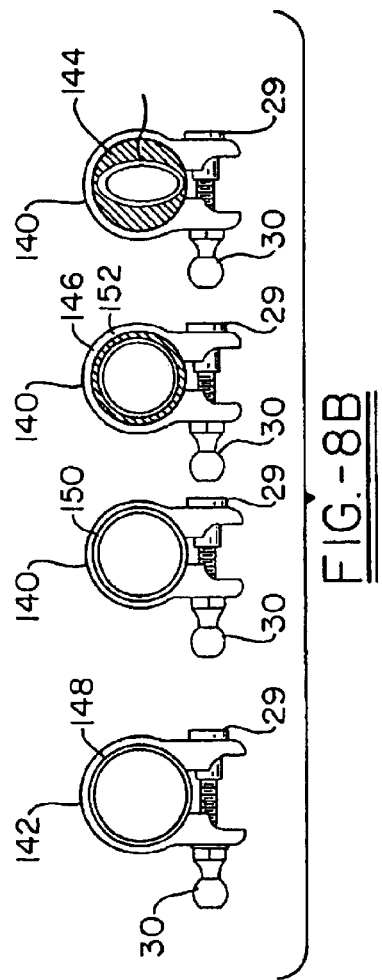 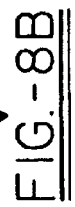 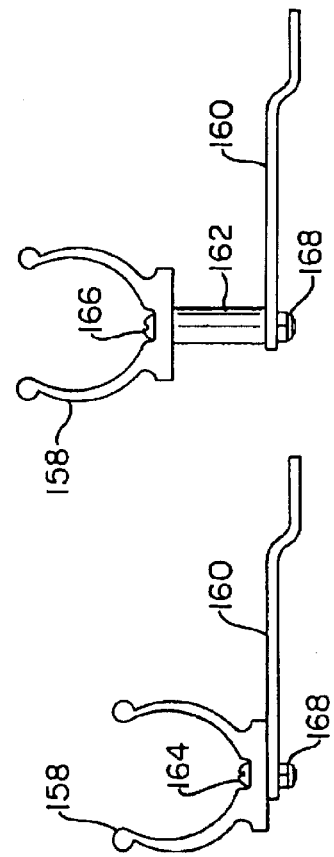 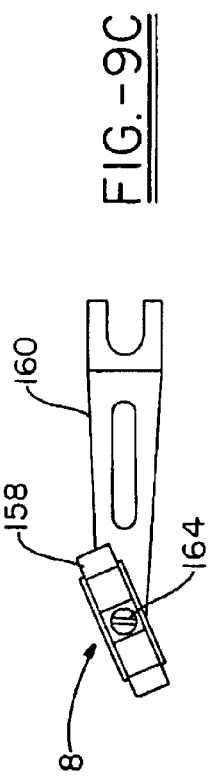
FIG.-8B
FIG.-9A
FIG.-9B
FIG.-9C
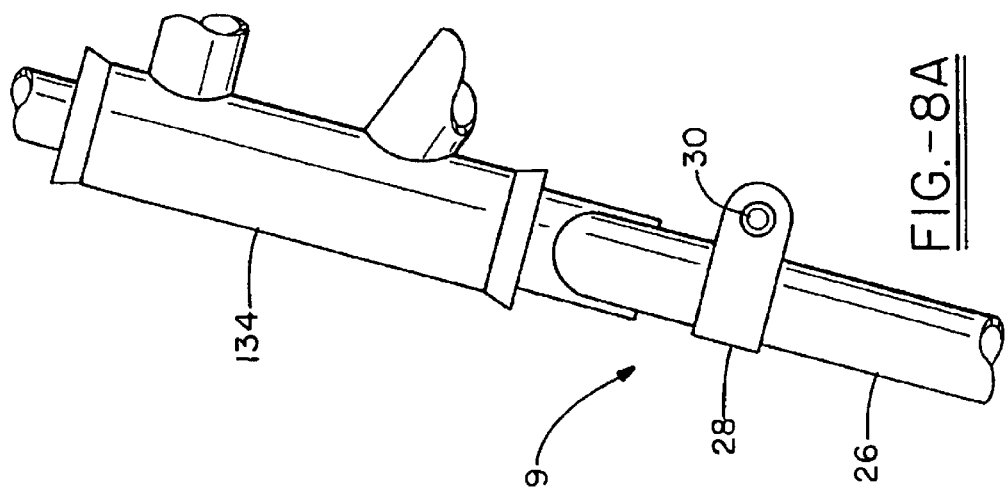
FIG.-8A

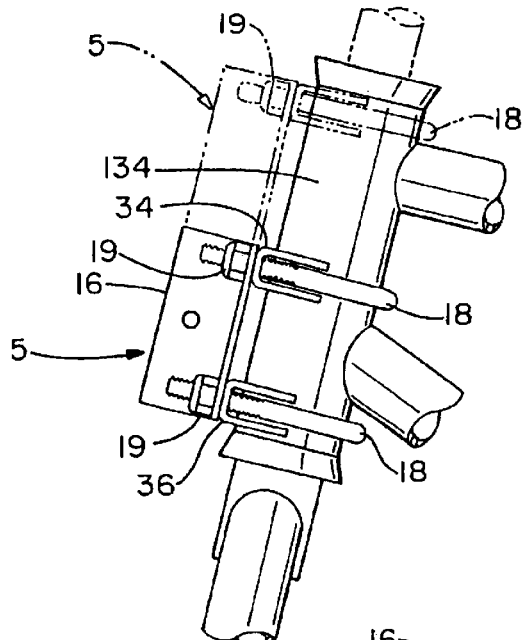
FIG.-20
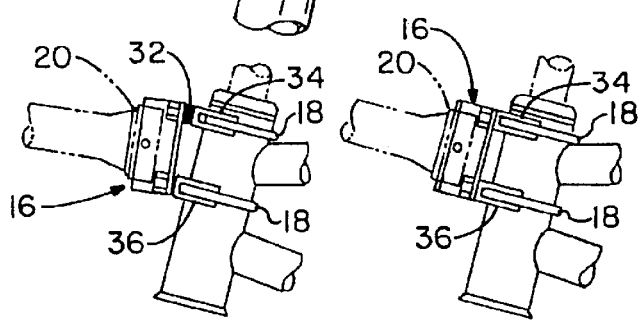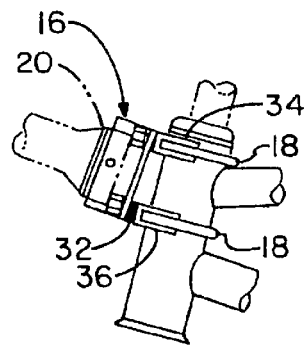
FIG.-21A    FIG.-21B    FIG.-21C
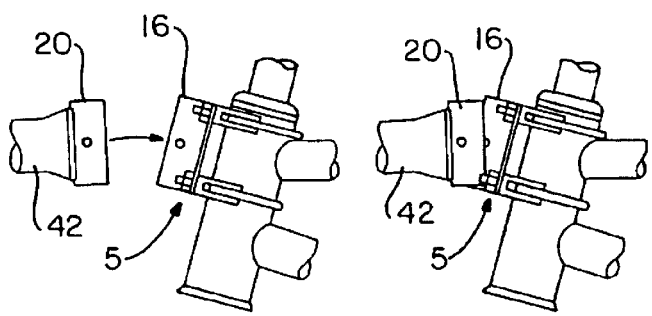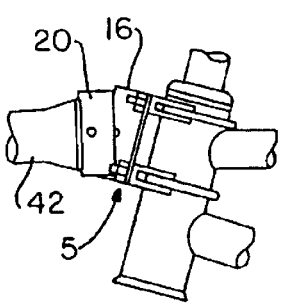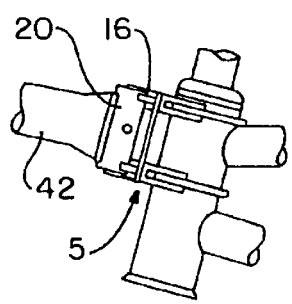
FIG.-22A    FIG.-22B    FIG.-22C

BICYCLE TOWING DEVICE

This application is a continuation of application Ser. No. 09/381,117 filed Nov. 29, 2001, now abandoned, which is a national stage of PCT International application Ser. No. PCT/US98/04810 filed Mar. 10, 1998, which claims priority to provisional application Ser. No. 60/039,938 filed Mar. 10, 1997, herein incorporated by reference.

TECHNICAL FIELD

The present invention relates generally to new and novel improvements in a bicycle towing device. More particularly, the present invention relates to a bicycle towing device which is positioned between a tow bicycle, such as an adult bicycle, and a towed bicycle, such as a child's bicycle, and enables the towed bicycle to function as a one wheeled bicycle trailer behind the tow bicycle.

BACKGROUND OF THE INVENTION

Bicycling has become a popular recreational activity which entire families can enjoy together. When families take bicycle rides together, it is often beneficial for each family member to begin the bicycle ride with their own bicycle. However, on such family bicycle rides, small children may not be able to keep up with their parents and older siblings. This generally necessitates separation of the family members or the family cutting the bicycle ride shorter than the parents and older siblings would desire.

SUMMARY OF THE INVENTION

Accordingly, an object of the present invention is the provision of a bicycle towing device which effectively turns a towed bicycle into a one wheeled bicycle trailer behind a tow bicycle. A further object of the present invention is the provision of a bicycle towing device which lifts the front wheel of a towed bicycle off the ground behind a tow bicycle.

These and other objects of the present invention are attained by a bicycle towing device which is positioned between a tow bicycle, such as an adult bicycle, and a towed bicycle, such as a child's bicycle, and enables the towed bicycle to function as a one wheeled bicycle trailer behind the tow bicycle. The bicycle towing device in accordance with the present invention enables the towing of an intact and ridable towed bicycle behind the tow bicycle by lifting the front wheel of the towed bicycle off the ground and, if desired, allows the towed bicycle to be pedaled while it is being towed by the tow bicycle. When not in use, the bicycle towing device in accordance with the present invention is capable of being collapsed and stored on the tow bicycle. When it is desired to operate the towed bicycle in a one wheeled bicycle trailer mode, the bicycle towing device is capable of being removed from its stored position on the tow bicycle, extended and quickly and easily attached to the towed bicycle such that the towed bicycle can be ridden as a one wheeled bicycle trailer behind the tow bicycle.

BRIEF DESCRIPTION OF THE DRAWINGS

FIG. 1 is a side view of a bicycle towing device in accordance with a first preferred embodiment of the present invention positioned between a tow bicycle and a towed bicycle.

FIG. 2 is a side view of the first preferred embodiment of the bicycle towing device shown in FIG. 1, as collapsed and stored on the tow bicycle when the bicycle towing device is not being used to tow a towed bicycle.

FIG. 3 is a side view of a bicycle tow bar in conjunction with the first preferred embodiment of a bicycle towing device shown in FIG. 1.

FIGS. 4a and 4b are an exploded top and side view and an assembled side view, respectively, of a seat post clamp assembly in conjunction with the first preferred embodiment of a bicycle towing device shown in FIG. 1.

FIGS. 5a, 5b and 5c are an exploded side view, an exploded top view and an assembled top view, respectively, of a universal joint assembly in conjunction with the first preferred embodiment of a bicycle towing device shown in FIG. 1.

FIGS. 6a and 6b are an exploded side view and an assembled side view, respectively, of a receiver assembly in conjunction with the first preferred embodiment of the bicycle towing device shown in FIG. 1.

FIGS. 7a, 7b, 7c and 7d are an exploded cross-sectional and side view, an exploded cross-sectional view, an exploded side view and an assembled side view, respectively, of a handlebar stabilizer assembly in conjunction with the first preferred embodiment of a bicycle towing device shown in FIG. 1.

FIG. 8a is an assembled side view, and FIG. 8b is plurality of figures shown side-by-side including a cross-sectional view of a second alternate preferred embodiment, a cross-sectional view of a third alternative preferred embodiment, a cross-sectional view of a fourth alternate preferred embodiment and a cross-sectional view of a fifth alternate preferred embodiment, respectively, of a fork tube clamp assembly in conjunction with the first preferred embodiment of a bicycle towing device shown in FIG. 1.

FIGS. 9a, 9b and 9c are an assembled top view of a first preferred embodiment, an assembled top view of a second alternate preferred embodiment, and an assembled side view, respectively, of a storage clip assembly in conjunction with the first preferred embodiment of a bicycle towing device shown in FIG. 1.

FIG. 20 is a side view of the receiver assembly mounted in an upper position (shown in phantom) and a lower position on the towed bicycle in conjunction with the first preferred embodiment of a bicycle towing device shown in FIG. 1.

FIGS. 21a, 21b and 21c are side views of the receiver assembly having head tube shims positioned between the receiver assembly and the upper head tube clamp, no head tube shims and head tube shims positioned between the receiver assembly and the lower head tube clamp, respectively, in conjunction with the first preferred embodiment of a bicycle towing device shown in FIG. 1.

FIGS. 22a, 22b and 22c are side views of the receiver assembly showing angled coupling ears on the coupler and protruding corresponding ears on the receiver progressively locking together under the weight of the towed bicycle in conjunction with the first preferred embodiment of a bicycle towing device shown in FIG. 1, respectively.

DETAILED DESCRIPTION OF THE DRAWINGS

Figure 10:
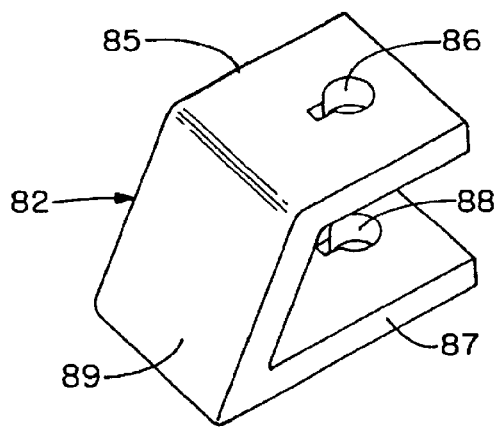
FIG. 10 is a perspective view of a first pivot fork in conjunction with the first preferred embodiment of a bicycle towing device shown in FIG. 1.

In the following detailed description of preferred embodiments of the present invention, reference is made to the accompanying drawings which, in conjunction with this detailed description, illustrate and describe a first, a second and a third preferred embodiment of a bicycle towing device in accordance with the present invention. Referring now to the drawings, in which like-referenced characters indicate corresponding elements throughout the several views, attention is first directed to FIGS. 1 and 2 which illustrate side views of a bicycle towing device in accordance with a first preferred embodiment of the present invention, generally identified by reference number 10. Bicycle towing device 10 is positioned between tow bicycle 12, for example, an adult bicycle, and towed bicycle 14, for example, a child's bicycle to enable towed bicycle 14 to function as a one wheeled bicycle trailer behind tow bicycle 12. Both tow bicycle 12 and towed bicycle 14 can be of conventional design. Bicycle tow bar 24 attaches to seat post 74 of tow bicycle 12 and can collapse and be stored and secured on the tow bicycle 12 using storage clip assembly 8. Receiver assembly 5 is attached to head tube 134 of towed bicycle 14 and fork tube clamp assembly 9 is attached to the forks of towed bicycle 14. Bicycle tow bar 24 is preferably attached to towed bicycle 14 by connecting bicycle tow bar 24 to receiver assembly 5 and placing quick release mechanism 56 through bicycle tow bar 24 and receiver assembly 5. Handlebar stabilizer assembly 7 of bicycle tow bar 24 is preferably attached to fork tube clamp assembly 9 to stabilize the handlebar of towed bicycle 14.

Referring now to FIG. 3, which is a side view of bicycle tow bar 24 in accordance with a first preferred embodiment of the present invention, bicycle tow bar 24 generally includes outer telescopic tow bar tube 42 which is slidably received in inner telescopic tow bar tube 44 and is locked in position by tube locking pin 40. Tube shim 114 is secured to the end of outer telescopic tow bar tube 42 and provides for clearance reduction and relative sliding between outer telescopic tow bar tube 42 and inner telescopic tow bar tube 44. Inner telescopic tow bar tube 44 is attached to universal joint assembly 3. Universal joint assembly 3 is attached to seat post clamp assembly 1 and is used to attach bicycle tow bar 24 to seat post 74 of towed bicycle 12. At the end of outer telescopic tow bar tube 42 is coupler 20 which is used to removably attach bicycle tow bar 24 to receiver assembly 5. Handlebar stabilizer assembly 7 is attached to outer telescopic tow bar tube 42 and attaches to fork tube clamp assembly 9 to stabilize the handlebar on towed bicycle 14.

Referring now to FIGS. 4a and 4b, which are an exploded top and side view and an assembled side view, respectively, of seat post clamp assembly 1 in conjunction with a first preferred embodiment of the present invention, seat post clamp 76 goes around seat post 74 of towed bicycle 12 and is secured by at least one bolt 78, washer 79, and nut 80 clamping seat post clamp 76 onto seat post 74. Seat post shims 81 may be used as necessary to clamp seat post clamp 76 on seat posts 74 having different diameters.

Referring now to FIGS. 5a, 5b and 5c, which are an exploded side view, an exploded top view and an assembled top view, respectively, of universal joint assembly 3 in conjunction with a first preferred embodiment of the present invention, first pivot fork 82 is rigidly affixed to seat post clamp 76. First pivot fork 82 is the first fork of universal joint assembly 3 which permits vertical and horizontal pivotal freedoms when towed bicycle 14 is being used as a one wheeled bicycle trailer. First pivot fork 82 is attached to pivot block 92 using first pivot bolt 90, friction washers 83, pivot washer 91, and pivot nut 93 to form the first and vertical axis of universal joint assembly 3. Second pivot fork 100, which is rigidly affixed to inner telescopic tow bar tube 44, is attached to the opposite end of pivot block 92 using second pivot bolt 98, friction washers 83, pivot washer 91, and pivot nut 93 to form the second and horizontal axis of universal joint assembly 3.

Referring now to FIGS. 6a and 6b which are an exploded side view and an assembled side view of receiver assembly 5 attached to head tube 134 of towed bicycle 14 in accordance with a first preferred embodiment of the present invention, receiver 16 is attached to head tube 134 of towed bicycle 14 using upper head tube clamp 34, lower head tube clamp 36, head tube clamp u-bolts 18, head tube clamp washers 17, and head tube clamp nuts 19. Receiver assembly 5 may include one or more head tube shims 32 which may be inserted between upper head tube clamp 34 and/or lower head tube clamp 36 and receiver 16 to facilitate adjustment of the angle of receiver 16 relative to head tube 134 of towed bicycle 14.

Referring now to FIGS. 7a, 7b, 7c and 7d, which shows an exploded cross-sectional and side view, an exploded cross-sectional view, an exploded side view and an assembled side view, respectively, of handlebar stabilizer assembly 9 in accordance with a first preferred embodiment of the present invention, handlebar stabilizer bar storage clip 136 is inserted into bicycle tow bar band clamp 70 using bicycle tow bar band clamp bolt 68, bicycle tow bar band clamp washer 69, and bicycle tow bar band clamp nut 71 as shown in FIGS. 7a and 7b. Handlebar stabilizer bar storage clip 136 is assembled on outer telescopic tow bar tube 42, handlebar stabilizer bar 64 is assembled to bicycle tow bar band clamp 70 and snap on ball joint socket 138 is assembled to handlebar stabilizer bar 64 as shown in FIG. 7c. Handlebar stabilizer assembly 7 is attached to outer telescopic tow bar tube 42 as shown in FIG. 7d. The handlebar of towed bicycle 14 are held in place by rotating snap on ball joint socket 138 at the end of handlebar stabilizer bar 64 and attaching snap on ball joint socket 138 to fork tube clamp assembly 9 on towed bicycle 14.

Referring now to FIGS. 8a and 8b, which show an assembled side view, a cross-sectional view of a second alternate preferred embodiment, a cross-sectional view of a third alternate preferred embodiment, a cross-sectional view of a fourth alternate preferred embodiment and a cross-sectional view of a fifth alternate preferred embodiment, respectively, of fork tube clamp assembly 9 in accordance with a first preferred embodiment of the present invention. Fork tube clamp assembly 9 is attached to fork tube 26 of towed bicycle 14 using fork tube band clamp 28 and ball joint ball 30, ball joint washer 31 and ball joint nut 29. Attachment to large diameter circular fork tube 148 can be accomplished by using large fork tube band clamp 142 as shown in FIG. 8b. Attachment to standard size circular fork tube 150 can be accomplished by using small fork tube band clamp 140 as shown in FIG. 8b. Attachment of fork tube assembly 9 to even smaller circular fork tube 152 can be accomplished by using the small fork tube band clamp 140 with circular shims 146 inserted between small fork tube band clamp 140 and even smaller fork tube 152 of towed bicycle 14 as shown in FIG. 8b. To secure fork tube clamp assembly 9 to oval shaped fork tube 154, oval shim 144 is inserted between oval shaped fork tube 154 and small fork tube band clamp 140 as shown in FIG. 8b.

Referring now to FIGS. 9a, 9b and 9c, which show an assembled top view of a first preferred embodiment, an assembled top view of an alternate second preferred embodiment, and an assembled side view of storage clip assembly 8, respectively, in accordance with a first preferred embodiment of the present invention, storage clip assembly 8 attaches to tow bicycle 12 to facilitate and secure the bicycle tow bar 24 in the stored position on tow bicycle 14. Bicycle tow bar storage clip 158 attaches to bicycle tow bar storage clip bracket 160 using bicycle tow bar storage clip screw 164 and bicycle tow bar storage clip nut 168. In a second alternate preferred embodiment, bicycle tow bar storage clip 158 is attached to bicycle tow bar storage clip bracket 160 using bicycle tow bar storage clip standoff screw 166, bicycle tow bar storage clip standoff 162 and bicycle tow bar storage clip nut 168. This second alternate preferred embodiment provides additional clearance between bicycle tow bar 24 and rear wheel 38 of tow bicycle 12 when bicycle tow bar 24 is in the stored position. Bicycle tow bar storage clip 158 is preferably free to rotate relative to bicycle tow bar storage clip bracket 160 to facilitate alignment of bicycle tow bar storage clip 158 and bicycle tow bar 24. Storage clip assembly 8 is attached to tow bicycle 12 by attaching bicycle tow bar storage clip bracket 160 to the rear axle of tow bicycle 12 using the rear axle attachment nut of tow bicycle 12. Storage clip assembly 8 can be rotated about the rear axle of tow bicycle 12 to further facilitate adjustment of the stored position of bicycle tow bar 24 on tow bicycle 12.

Referring again to FIGS. 4a and 4b, which are an exploded top and side view and an assembled side view, respectively, of seat post clamp assembly 1 in conjunction with a first preferred embodiment of the present invention, seat post clamp 76 is similar to a typical seat post clamp found on most bicycles and has a substantially U-shaped configuration to go around seat post 74 of towed bicycle 12 and is secured by at least one bolt 78, washer 79 and nut 80, thus clamping seat post clamp 76 onto seat post 74. The diameter of seat post clamp 76 is preferably dimensioned to fit the largest anticipated seat post 74 size with smaller seat posts 74 being accommodated using one or more seat post shims 81. The height of seat post clamp 76 is preferably dimensioned to be at least as high as first pivot fork 82 and the thickness of seat post clamp 76 is preferably such that it is capable of handling the stresses of the conditions imposed thereon.

Seat post shims 81 preferably have a substantially circular cross section and are designed to enable seat post clamp 76 to attach to seat posts 74 having smaller diameters. Seat post shims 81 are preferably dimensioned to be at least as high as seat post clamp 76, and preferably longer, to enable easy installation. Multiple seat post shims 81 preferably having substantial circular cross sections and various thicknesses may be used as necessary to clamp seat post clamp 76 on seat posts 74 having different diameters.

Referring now to FIG. 10, which shows a perspective view of first pivot fork 82 in accordance with a first preferred embodiment of the present invention, first pivot fork 82 is preferably a generally C-shaped structure having concentric holes 86 and 88 in generally rectangular outer flange portions 85 and 87, respectively, as shown. First pivot fork 82 is constructed such that at least one horizontal flat surface extends outwardly from seat post clamp 76. More preferably, two flat horizontal surfaces extend outwardly from seat post clamp 76. In order for the turning geometry of tow bicycle 12 and towed bicycle 14 to be correct when cornering, the pivot axis should be in the plane of rear wheel 38 of tow bicycle 12 and parallel to a line which goes through the center of the rear axle of tow bicycle 12 and the point of contact of rear wheel 38 of tow bicycle 12. This is a vertical axis when tow bicycle 12 is straight up and down on a level surface.

First pivot fork 82 includes two generally rectangular outer flange portions 85 and 87 which are substantially parallel to each other so pivot block 92 is engaged between generally rectangular outer flange portions 85 and 87 of first pivot fork 82. The spacing between the two generally rectangular outer flange portions 85 and 87 is dimensioned to accommodate friction washers 83 which may be used between pivot block 92 and first pivot fork 82. The height of first pivot fork 82 is preferably at least as high as pivot block 92 and generally rectangular back portion 89 between generally rectangular outer flange portions 85 and 87 should be of sufficient size to facilitate attachment to seat post clamp 76. First pivot fork 82 is attached to pivot block 92 by a bolt and a nut or by a quick release mechanism. A quick release mechanism would permit the removal and installation of bicycle tow bar 24 from and to tow bicycle 12 to be preformed in a quick and easy manner, the quick release mechanism being applicable to the first and/or the second pivot axes. Generally rectangular back portion 89 is attached to seat post clamp 76 by welding or by some other joining process. Generally rectangular outer flange portions 85 and 87 meet generally rectangular back portion 89 at angles that provides for generally rectangular outer flange portions 85 and 87 to be generally horizontal and parallel when attached to seat post clamp 76 which is in turn attached to seat post 74 of tow bicycle 12. Since seat posts 74 may vary in angle between different bicycles, the angle at which generally rectangular outer flange portions 85 and 87 meet generally rectangular back portion 89 should be chosen to accommodate the median of the various seat post 74 angles.

Figure 11:
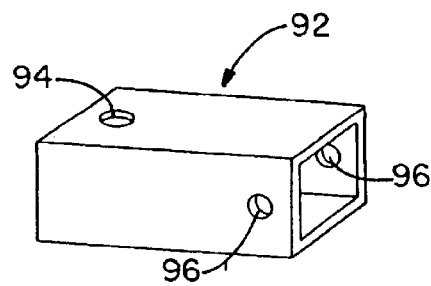
FIG. 11 is a perspective view of a pivot block in conjunction with the first preferred embodiment of a bicycle towing device shown in FIG. 1.

Referring now to FIG. 11, which shows a perspective view of pivot block 92 in accordance with a first preferred embodiment of the present invention, pivot block 92 is attached to first pivot bolt 90. Pivot block 92 acts as an intermediate between the first and second pivots of universal joint 84. Pivot block 92 has a pair of holes 94 and 96 which allow for mating with first pivot bolt 90 and second pivot bolt 98, respectively. Holes 94 and 96 are preferably substantially perpendicular to each other and are located at opposite ends of pivot block 92. Holes 94 and 96 are also preferably approximately the same diameter as first pivot fork 82 and second pivot fork 100. In addition, pivot block 92 is preferably of sufficient length to enable bicycle two bar 24 to be folded down and stored on tow bicycle 12 without hitting rear wheel 38 of tow bicycle 12. The cross-section of pivot block 92 preferably has a substantially square configuration and is dimensioned to fit between first pivot fork 82 and second pivot fork 100. The overall width of pivot block 92 may be dependent on whether friction washers 83 are used between pivot block 92 and first pivot fork 82 and second pivot fork 100.

Figure 12:
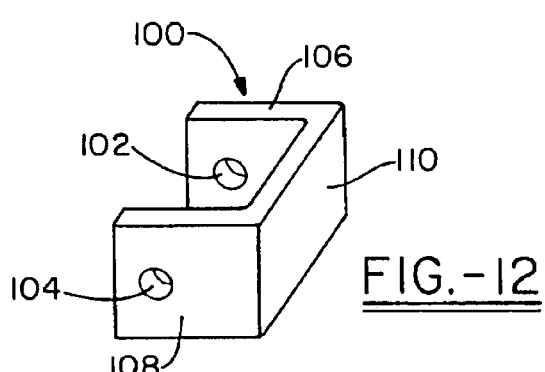
FIG. 12 is a perspective view of a second pivot fork in conjunction with the first preferred embodiment of a bicycle towing device shown in FIG. 1.

Referring now to FIG. 12, which shows a perspective view of second pivot fork 100 in accordance with a first preferred embodiment of the present invention, second pivot fork 100 is preferably a U-shaped structure having concentric holes 102 and 104 in generally rectangular outer flange portions 106 and 108, respectively, as shown. Second pivot fork 100 includes two generally rectangular outer flange portions 106 and 108 which are substantially parallel to each other and is formed in a substantially U-shaped manner so pivot block 92 is engaged between first pivot fork 82 and second pivot fork 100. The spacing between the two generally rectangular outer flange portions 106 and 108 is dimensioned to accommodate friction washers 83, as well as any friction reducing caps, such as pivot block 92, which may be used between pivot block 82 and second pivot fork 100. The height of second pivot fork 100 is preferably at least as high as pivot block 92 and generally rectangular back portion 110 between generally rectangular outer flange portions 106 and 108 should be of sufficient size to facilitate attachment to inner telescopic tow bar tube 44. Second pivot fork 100 is attached to pivot block 92 by a bolt and a nut or by a quick release mechanism. A quick release mechanism would permit the removal and installation of bicycle tow bar 24 from and to tow bicycle 12 to be preformed in a quick and easy manner, the quick release mechanism being applicable to the first and/or the second pivot axes. Generally rectangular back portion 110 is attached to the upper end of inner telescopic tow bar tube 44 by welding or by some other joining process.

Figure 13:
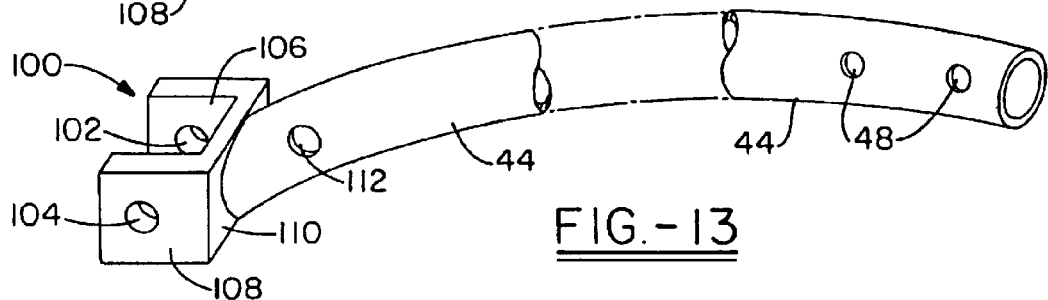
FIG. 13 is a perspective view of the second pivot fork assembled to an inner telescopic tow bar tube in conjunction with the first preferred embodiment of a bicycle towing device shown in FIG. 1.

Referring now to FIG. 13, which shows a perspective view of second pivot fork 100 assembled to inner telescopic tow bar tube 44 in accordance with a first preferred embodiment of the present invention, inner telescopic tow bar tube 44 is preferably fabricated from a curved piece of hollow tube having a circular cross-section and is of sufficient strength and size to support the loads imposed thereon. Second pivot fork 100 is attached at one end of inner telescopic tow bar tube 44 by welding or some other joining process. Inner telescopic tow bar tube 44 is preferably dimensioned so it can slide, with sufficient clearance for a bushing, inside of outer telescopic tow bar tube 42. At least two holes 48 and 112 are drilled into inner telescopic tow bar tube 44 and these holes 48 and 112 are used to lock inner telescopic tow bar tube 44 and outer telescopic tow bar tube 42 together in the extended and collapsed positions, respectively. A plurality of holes 48 are preferably provided to allow for multiple extended lengths of bicycle tow bar 24 for use with towed bicycles 14 having different sizes. The length of inner telescopic tow bar tube 44 and outer telescopic tow bar tube 42 are preferably substantially the same so the collapsed length of bicycle tow bar 24 will be minimized and the extended length of bicycle tow bar 24 will be maximized. Inner telescopic tow bar tube 44 and outer telescopic tow bar tube 42 are preferably long enough to allow sufficient overlap of inner telescopic tow bar tube 44 and outer telescopic tow bar tube 42 in their extended position to provide sufficient strength during operation. Holes 48 and 112 are preferably drilled substantially perpendicular to the surface of inner telescopic tow bar tube 44 and parallel to the axis of second pivot bolt 98 and are dimensioned to provide sufficient strength in inner telescopic tow bar tube 44, as well as in tube locking pin 40. Inner telescopic tow bar tube 44 in the preferred embodiment is of curved design with the curvature substantially matching that of outer telescopic tow bar tube 42 to facilitate telescoping of inner telescopic tow bar tube 44 into outer telescopic tow bar tube 42. The radius curvature of inner telescopic tow bar tube 44 and the outer telescopic tow bar tube 42 is preferably chosen so that the angle of coupler 20 at the end of telescopic tow bar tube 42 is substantially the same as the angle of head tube 134 of a typical towed bicycle 14 being operated in a one wheeled bicycle trailer mode.

Figure 14:
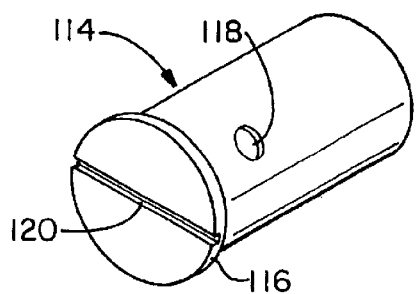
FIG. 14 is a perspective view of a tube shim in conjunction with the first preferred embodiment of a bicycle towing device shown in FIG. 1.

Referring now to FIG. 14, which shows a perspective view of tube shim 114 in accordance with a first preferred embodiment of the present invention, tube shim 114 is preferably placed between inner telescopic tow bar tube 44 and outer telescopic tow bar tube 42 to compensate for clearance between inner telescopic tow bar tube 44 and outer telescopic tow bar tube 42 and to facilitate relative sliding between inner telescopic tow bar tube 44 and outer telescopic tow bar tube 42. Tube shim 114 is preferably fabricated from a material which can handle the loads, as well as minimize friction, when inner telescopic tow bar tube 44 and outer telescopic tow bar tube 42 are moved from their extended to collapsed positions. Tube shim 114 preferably includes lip 116 on its end which is dimensioned to snap over the end of outer telescopic tow bar tube 42 and also includes hole 118 which is positioned to align with hole 46 in outer telescopic tow bar tube 42 when so snapped in place. Hole 118 in tube shim 114 is preferably larger than hole 46 in outer telescopic tow bar tube 42 to compensate for slight misalignments which may occur during installation. Tube shim 114 preferably includes slit 120 on its bottom side to bridge the seam in seamed tubing, to accommodate manufacturing variations and to provide for deformation which may occur when curved outer telescopic tow bar tube 42 and inner telescopic tow bar tube 44 are used.

Referring again to FIG. 3, which shows a side view of bicycle tow bar 24 in accordance with a first preferred embodiment of the present invention, tube locking pin 40 is inserted between inner telescopic tow bar tube 44 and outer telescopic tow bar tube 42 to facilitate the locking together of inner telescopic tow bar tube 44 and outer telescopic tow bar tube 42 in either the stored position or the extended position. Tube locking pin 40 is preferably dimensioned to closely match the size of the holes 48 and 112 in inner telescopic tow bar tube 44 and hole 46 in outer telescopic tow bar tube 42. Tube locking pin 40 preferably includes a safety latch to hold tube locking pin 40 in place and prevent accidental removal.

Figure 15A:
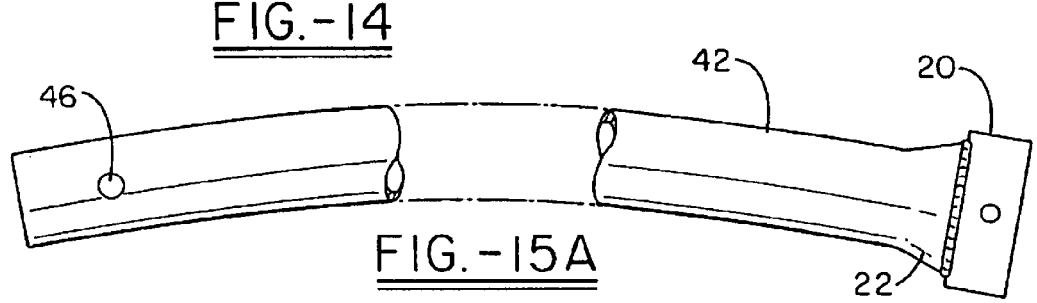
FIGS. 15a and 15b are a side view of the outer telescopic tow bar tube attached to a coupler and a top view of the outer telescopic tow bar tube attached to the coupler, respectively, in conjunction with the first preferred embodiment of a bicycle towing device shown in FIG. 1.
Figure 15B:
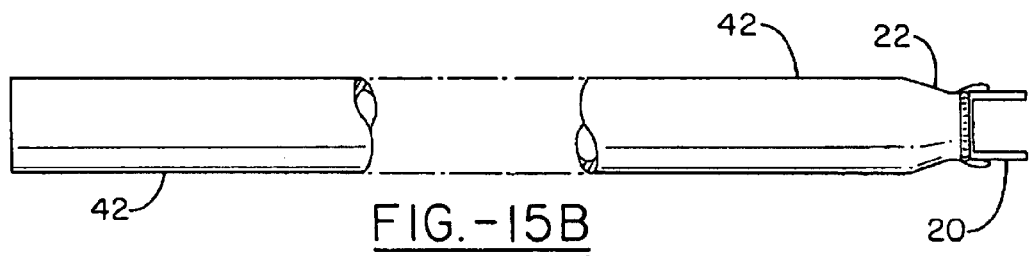

Referring now to FIGS. 15a and 15b, which show a side view of outer telescopic tow bar tube 42 attached to coupler 20 and a top view of outer telescopic tow bar tube 42 attached to coupler 20 in accordance with a first preferred embodiment of the present invention, outer telescopic tow bar tube 42 is designed to collapse by sliding over inner telescopic tow bar tube 44. The length of outer telescopic tow bar tube 42 is preferably substantially the same as the length of inner telescopic tow bar tube 44 with the combined length being sufficient to provide for adequate clearance between rear wheel 38 of tow bicycle 12 and front wheel 50 of towed bicycle 14 when in an extended position. The inner diameter of outer telescopic tow bar tube 42 is such that it can slide over inner telescopic tow bar tube 44 with sufficient clearance for tube shim 114. The thickness of outer telescopic tow bar tube 42 is preferably sufficient to accommodate the stresses imposed on bicycle tow bar 24, but is not so thick as to preclude the insertion of inner telescopic tow bar tube 44 into outer telescopic tow bar tube 42. Hole 46 is preferably placed in the end of outer telescopic tow bar tube 42 distal from coupler 20 and matches both the position and the size of corresponding hole 118 in tube shim 114 and hole 112 in inner telescopic tow bar tube 44. Hole 46 is preferably drilled substantially perpendicular to the surface of outer telescopic tow bar tube 42 and substantially parallel to the hole through coupler 20. At the end of outer telescopic tow bar tube 42 towards towed bicycle 14, outer telescopic tow bar tube 42 is flattened so the width is sufficiently thin to permit that end to be attached to coupler 20 by welding or some other joining process. Outer telescopic tow bar tube 42 in the preferred embodiment is of a curved design with the curvature substantially corresponding to that of inner telescopic tow bar tube 44 to facilitate telescoping of inner telescopic tow bar tube 44 in outer telescopic tow bar tube 42. The radius curvature of inner telescopic tow bar tube 44 and outer telescopic tow bar tube 42 is preferably chosen so that the angle of coupler 20 at the end of inner telescopic tow bar tube 44 is substantially the same as the angle of head tube 136 of a typical towed bicycle 14 being operated in a one wheeled bicycle trailer mode.

Figure 16A:
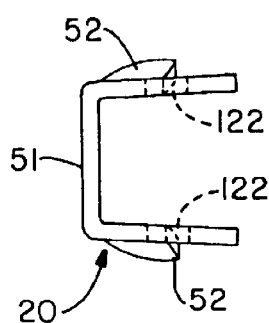
FIGS. 16a and 16b are a top view and a perspective view, respectively, of the coupler in conjunction with the preferred embodiment of a bicycle towing device shown in FIG. 1.
Figure 16B:
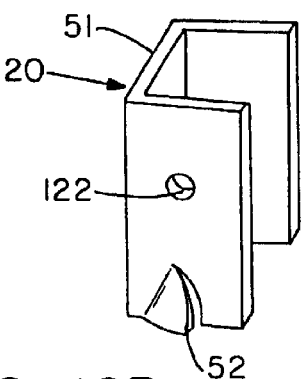

Referring now to FIGS. 16a and 16b, which show a top view and a perspective view of coupler 20 in accordance with a first preferred embodiment of the present invention, coupler 20 is preferably attached to the end of outer telescopic tow bar tube 42 and mates to receiver 16 mounted on towed bicycle 14. Coupler 20 is preferably substantially U-shaped in configuration and includes angled coupling ears 52 cut and bent into the middle of the lower edge of coupler 20.

Coupler 20 is preferably dimensioned to correspond with the height and width of receiver 16. By lifting bicycle tow bar 24 and the front of towed bicycle 14, coupler 20 is tilted relative to receiver 16 and slid down over receiver 16 until angled coupling ears 52 of coupler 20 bottom out on protruding corresponding ears 54 of receiver 16. When towed bicycle 14 is lowered, the weight of towed bicycle 14 will tend to pull the bottom of coupler 20 away from receiver 16 and push the top of coupler 20 into receiver 16. Angled coupling ears 52 on coupler 20 are of a generally circular design with center of curvature 53 of angled coupling ears 52 being located on the bottom inside line of front face 51 of coupler 20 to facilitate smooth engagement and locking with protruding corresponding ears 54 on receiver 16. Angled coupling ears 52 on coupler 20 and protruding corresponding ears 54 on receiver 16 will lock together mating coupler 20 and receiver 16 and hold front wheel 50 of towed bicycle 14 off the ground. Hole 122 is provided in coupler 20 and hole 124 is provided in receiver 16 through which quick release mechanism 56 is placed to rigidly bind coupler 20 and receiver 16 together.

Figure 17A:
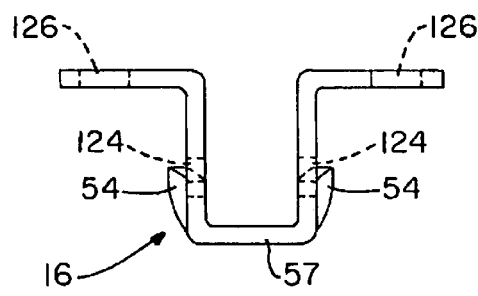
FIGS. 17a and 17b are a top view and a perspective view, respectively, of the receiver in conjunction with the first preferred embodiment of a bicycle towing device shown in FIG. 1.
Figure 17B:
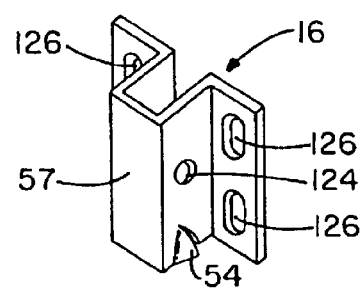

Referring now to FIGS. 17a and 17b, which show a top view and a perspective view, respectively, of receiver 16 in accordance with a first preferred embodiment of the present invention, angled coupling ears 52 cut in coupler 20 and protruding corresponding ears 54 cut in receiver 16 are preferably of a circular profile and are directed toward bicycle tow bar 24 as shown to facilitate the automatic locking of coupler 20 and receiver 16 when engaged and to provide smooth engagement. Protruding corresponding ears 54 on receiver 16 are of a generally circular design with center of curvature 55 of protruding corresponding ears 54 being located on the bottom inside line of front face 57 of receiver 16 to facilitate smooth engagement and locking with angled coupling ears 52 on coupler 20. Thus, receiver 16 is provided to rigidly mate with coupler 20 and to bolt onto the front of towed bicycle 14.

Receiver 16 is preferably fabricated by bending or stamping substantially 90 degree bends into sheet metal material as shown. The outside of the mating protrusion of receiver 16 is dimensioned to correspond with the inside width of coupler 20. The protrusion depth is preferably deeper than the depth of the mating coupler 20. Hole 124 in the protrusion is provided that geometrically corresponds to hole 122 in coupler 20. The overall width of coupler 20 and mounting slots 126 are dimensioned to correspond with the width of head tube clamp u-bolts 18 which go around head tube 134 of towed bicycle 14. Receiver 16 is preferably fabricated from a material which is sufficiently strong to withstand the stresses imposed thereon. The height of receiver 16, and thus the height of coupler 20, are preferably such that head tube clamp u-bolts 18 which go around head tube 134 of towed bicycle 14 can be placed on towed bicycle 14 without hitting any of the frame tubes which are welded to head tube 134 on towed bicycle 14. Mounting slots 126 in receiver 16 are preferably elongated to enable further adjustment and to preclude interfering with the frame of towed bicycle 14. Thus, the height of receiver 16 is preferably neither too short or too long or bolting of receiver 16 on head tube 134 of towed bicycle 14 would be precluded. Receiver 16 and coupler 20 can be of tapered design if desired so as to produce a positive engagement using the weight of towed bicycle 14 to lock coupler 20 and receiver 16 together using the taper.

Figure 18:
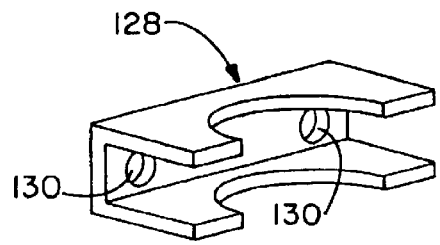
FIG. 18 is a perspective view of a head tube clamp in conjunction with the first preferred embodiment of a bicycle towing device shown in FIG. 1.

Referring now to FIG. 18, which shows a perspective view of head tube clamp 128 in conjunction with a first preferred embodiment of the present invention, receiver 16 is bolted to head tube 134 of towed bicycle 14 using head tube clamps 128. Head tube clamps 128 provide a circular surface on one side for mating with head tube 134 of towed bicycle 14 and a flat surface on the other side for mating with receiver 16. The circular mating surface is dimensioned to fit on the largest head tubes 134 anticipated and will still function on smaller head tubes 134 by bending head tube clamp 128 until it collapses down onto smaller head tubes 134.

Receiver 16 and head tube clamps 128 are held onto head tube 134 of towed bicycle 14 using head tube clamp u-bolts 18 which go around head tube 134. The circular surface which mates with head tube 134 is preferably dimensioned to fit head tubes 134 of towed bicycle 14. Holes 130 through the flat surface of head tube clamp 128 and the width of head tube clamp 128 are preferably dimensioned to correspond with the hole size and width of receiver 16. The height of head tube clamp 128 is preferably sufficient to provide for adequate strength and clearance for holes 130 for head tube clamp u-bolts 18.

Referring again to FIGS. 6a and 6b, which show an exploded side view and an assembled side view of receiver assembly 5 attached to head tube 134 of towed bicycle 14 in accordance with a first preferred embodiment of the present invention, head tube clamp u-bolts 18 used to mount receiver 16 onto head tube 134 of towed bicycle 14 are preferably dimensioned to correspond with mounting slots 126 in receiver 16 and holes 130 in head tube clamp 128. Head tube clamp u-bolts 18 are preferably of sufficient size and strength to accommodate the loads imposed thereon and the width is preferably adequate to go around head tube 134 of towed bicycle 14. The head tube clamp u-bolts 18 can be flattened on the inside of the curved portion to increase the surface area and thus reduce the localized stresses imposed on head tube 134 of towed bicycle 14.

Figure 19:
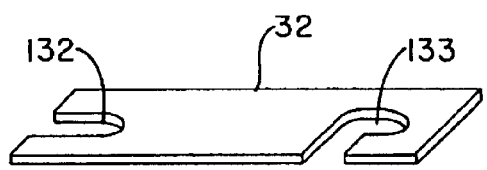
FIG. 19 is a prospective view of a head tube shim in conjunction with the first preferred embodiment of a bicycle towing device shown in FIG. 1.

Referring now to FIG. 19, which shows a perspective view of head tube shim 32 in accordance with a first preferred embodiment of the present invention, one or more head tube shims 32 are used to change the angle of receiver 16 relative to head tube 134 of towed bicycle 14 by cutting head tube shims 32 to the proper size and placing appropriate slots 132 and 133 at each end thereof. Slots 132 and 133 enable head tube shims 32 to be inserted between receiver 16 and head tube clamp 128 without having to fully remove receiver 16 from head tube clamp 128. The width of head tube shims 32 are preferably dimensioned to correspond with the width of receiver 16 and the height of head tube shims 32 are preferably dimensioned to correspond with the height of head tube clamp 128. Slots 132 and 133 are positioned and dimensioned to correspond with mounting slots 126 in receiver 16 and holes 130 in head tube clamp 128. The thickness of head tube shims 32 is preferably sufficiently thin so that small angle adjustments can be readily made and multiple head tube shims 32 can be used for larger angle adjustments.

Referring again to FIGS. 1 and 2, which illustrate side views, of a bicycle towing device in accordance with a first preferred embodiment of the present invention, quick release mechanism 56 is inserted through coupler 20 and receiver 16 to removably and rigidly bind coupler 20 to receiver 16. Quick release mechanism 56 preferably includes a threaded shaft which is long enough to span the width of coupler 20 and is of such a design as to provide sufficient force to bind rigidly bind coupler 20 to receiver 16. The shaft of quick release mechanism 56 preferably includes a shouldered portion which is slightly shorter then the width of coupler 20 to maintain close tolerance between holes 122 in coupler 20 and holes 124 in receiver 16 and the shaft of quick release mechanism 56.

Referring again to FIGS. 7a, 7b, 7c and 7d, which show handlebar stabilizer assembly 7 in accordance with a first preferred embodiment of the present invention, bicycle tow bar band clamp 70 is preferably dimensioned to fit around outer telescopic tow bar tube 42 and not bottom out when clamped to bicycle tow bar 24 and the upper protruding portion is designed to accept handlebar stabilizer bar storage clip 136. This allows handlebar stabilizer bar 64 to pivot about bicycle tow bar band clamp 70 for rotation between the storage position and the extended position. Bicycle tow bar band clamp 70 is preferably of sufficient width and strength to withstand the stresses imposed thereon during operation of bicycle tow device 10.

Handlebar stabilizer bar storage clip 136 is preferably designed to fit closely inside the protruding portions of bicycle tow bar band clamp 70 and be held securely in place by bicycle tow bar band clamp 70 with a portion extending outside bicycle tow bar band clamp 70 perpendicular to the axis of bicycle tow bar band clamp bolt 68 and parallel to the axis of outer telescopic tow bar tube 42. Handlebar stabilizer bar storage clip 136 is designed to snap onto and hold handlebar stabilizer bar 64 securely when in the stored position.

Handlebar stabilizer bar 64 is designed to pivot about bicycle tow bar band clamp bolt 68 for rotation between the storage position and the handlebar stabilizing extended position. Handlebar stabilizer bar 64 is preferably flattened on one end and threaded on the opposite end to accept snap on ball joint socket 138 and is curved to substantially correspond with the curvature of the underside of bicycle tow bar 24. Preferably the flattened end has a hole in it that substantially corresponds to the size of bicycle tow bar band clamp bolt 68. Handlebar stabilizer bar 64 preferably has a substantially circular cross section and is of sufficient diameter and strength to withstand the stresses induced thereon during operation in the extended position.

Snap on ball joint socket 138 is designed to attach to the end of handlebar stabilizer bar 64 using internal threads on one end and includes a cavity which can snap onto ball joint ball 30 which is attached to fork tube 26 of towed bicycle 14. Snap on ball joint socket 138 is preferably made of a plastic material to facilitate the ability to snap onto ball joint ball 30. The size of the cavity is dimensioned that snap on ball joint socket 138 remains securely attached to ball joint ball 30 while in operation, but can be removed from ball joint ball 30 without excessive force. Snap on ball joint socket 138 can be rotated about the axis of handlebar stabilizing bar 64 to facilitate alignment with ball joint ball 30.

Referring again to FIGS. 8a and 8b which show fork tube clamp assembly 9 in accordance with a first preferred embodiment of the present invention, fork tube band clamp 28 is similar in design to a typical seat post clamp and is dimensioned to fit large diameter fork tubes 148 using a large fork tube band clamp 142 and standard size circular fork tubes 150 using small fork tube band clamp 140. Fork tube band clamp 28 is preferably of sufficient size and strength to facilitate secure attachment to fork tube 26 of towed bicycle 14. The holes in fork tube band clamp 28 are preferably dimensioned to correspond with the diameter of the threaded portion of ball joint ball 30 and include a slotted cut out to accommodate a captive type nut.

Ball joint ball 30 is of an appropriate size and dimension to accommodate snap on ball joint socket 138. The threaded portion of ball joint ball 30 is preferably of sufficient length to reach ball joint nut 29 when used with both large fork tube band clamp 142 and small fork tube band clamp 140. The threads are preferably dimensioned to correspond with the size of the holes in the fork tube band clamps 28 and ball joint ball 30 is preferably made to accommodate the stresses imposed thereon during use.

If desired, one or more circular shims 146 may be placed between even smaller circular fork tube 152 and small fork tube band clamp 140 as shown in FIG. 8b to compensate for excessive clearance therebetween. Similarly, oval shim 144 can be placed between oval shaped fork tube 154 and small fork tube band clamp 140 as shown in FIG. 8b to provide a substantially circular diameter for oval shaped fork tube 154 and to compensate for excessive clearance therebetween.

Referring again to FIGS. 9a, 9b and 9c, which show storage clip assembly 8 in accordance with a first preferred embodiment of the present invention, bicycle tow bar storage clip 158 is designed to snap onto the outer telescopic tow bar tube 42 of bicycle tow bar 24 and retain the bicycle tow bar 24 securely while in the stored position. Bicycle tow bar storage clip 158 is preferably of sufficient size and strength to snap onto outer telescopic tow bar tube 42 and hold bicycle tow bar 24 securely on tow bicycle 12 when bicycle tow bar 24 is in the stored position. Bicycle tow bar storage clip 158 is preferably free to rotate relative to bicycle tow bar storage clip bracket 160 to facilitate alignment of bicycle tow bar storage clip 158 and bicycle tow bar 24. Bicycle tow bar storage clip standoff 162 in a second alternate preferred embodiment of the storage clip assembly 8 is used to provide additional clearance between bicycle tow bar 24 and rear wheel 38 of tow bicycle 12 when bicycle tow bar 24 is in the stored position. Bicycle tow bar storage clip standoff 162 is used in conjunction with bicycle tow bar storage clip standoff screw 166 and both must be of sufficient length to facilitate the repositioning of bicycle tow bar 24 away from tow bicycle 12 such that bicycle tow bar 24 is sufficiently far away from rear wheel 38 of tow bicycle 12. Storage clip assembly 8 is attached to tow bicycle 12 by attaching bicycle tow bar storage clip bracket 160 onto the rear axle of tow bicycle 12 using the rear axle attachment nut of tow bicycle 12. Bicycle tow bar storage clip bracket 160 preferably has slot 170 at the end opposite bicycle tow bar storage clip 158 that is of a sufficient dimension to go around the rear axle of tow bicycle 12. Storage clip assembly 8 is preferably rotatable about the rear axle of tow bicycle 12 to further facilitate adjustment of the stored position of bicycle tow bar 24 on tow bicycle 12.

One or more separate receiver assemblies 5 and fork tube clamp assemblies 9 can be provided so different towed bicycles 14 can be used with bicycle tow bar 24. When this arrangement is used, a separate quick release clamp can be provided to replace bicycle tow bar band clamp bolt 68 and bicycle tow bar band clamp nut 72 so the position of handlebar stabilizer assembly 7 can be quickly and easily adjusted to the specific towed bicycle 14 by moving handlebar assembly 7 about and along bicycle two bar 24 to align handlebar stabilizer assembly 7 with fork tube clamp assembly 9. The quick release clamp can be then tightened to secure handlebar stabilizer assembly 7 to bicycle tow bar 24.

Referring now to FIG. 20, which is a side view of receiver assembly 5 mounted in an upper and a lower position, respectively, on towed bicycle 14 in accordance with a first preferred embodiment of the present invention, to facilitate adjustment of the first preferred embodiment of bicycle towing device 10 to towed bicycle 14, receiver assembly 5 is designed to compensate for variations in the size and configuration of tow bicycle 12 and towed bicycle 14. One such adjustment is shown in FIGS. 20a and 20b where receiver assembly 5 can be mounted in either an upper position or in a lower position, respectively, thus raising or lowering the front end of towed bicycle 14.

Referring to FIGS. 21a, 21b and 21c, which are side views of receiver assembly 5 having head tube shims 32 positioned between receiver 16 and upper head tube clamp 34, no head tube shims, and head tube shims 32 positioned between receiver 16 and lower head tube clamp 36, respectively, to facilitate adjustment of the first preferred embodiment of bicycle towing device 10 to towed bicycle 14, permits adjustment of the angle of receiver 16 relative to head tube 134 of towed bicycle 14. Thus, as seen in FIGS. 21a, 21b and 21c, one or more head tube shims 32 can be positioned between either upper head tube clamp 34 and/or lower head tube clamp 36 to adjust the relative angle of receiver 16.

To align handlebar stabilizer assembly 7 with fork tube clamp assembly 9, snap on ball joint socket 138 at the end of handlebar stabilizer bar 64 is rotated until it is substantially aligned with ball joint ball 30 on fork tube band clamp 28 attached to fork tube 26 on towed bicycle 14. During the initial set up of bicycle tow device 10, handlebar stabilizer bar 64 and snap on ball joint socket 138 are substantially aligned with ball joint ball 30 on fork tube band clamp 28 by moving bicycle tow bar band clamp 70 along and about bicycle tow bar 24. Snap on ball joint socket 138 is preferably rotatable about the axis and threaded on handlebar stabilizer bar 64 to facilitate further alignment between snap on ball joint socket 138 and ball joint ball 30. Storage clip assembly 8 is preferably rotatable about the rear axle of tow bicycle 12 to further facilitate positioning of bicycle tow bar 24 when stored.

To use bicycle tow device 10, bicycle tow bar 24 is first extended from the collapsed and folded down position shown in FIG. 2 by removing tube locking pin 40 and sliding outer telescopic tow bar tube 42 over inner telescopic tow bar tube 44 until hole 46 in outer telescopic tow bar tube 42 is aligned with the desired one of a plurality of holes 48 in inner telescopic tow bar tube 44. By varying which hole in the plurality of holes 48 in inner telescopic tow bar tube 44 is used, the distance between rear wheel 38 of tow bicycle 12 and front wheel 50 of towed bicycle 14 can be changed. After extending bicycle tow bar 24 and locking inner telescopic tow bar tube 44 and outer telescopic tow bar tube 42 with tube locking pin 40, bicycle tow bar 24 can be connected to towed bicycle 14 by mating coupler 20 at one end 22 of bicycle tow bar 24 to receiver 16 attached to towed bicycle 14. By raising both bicycle tow bar 24 and the front of towed bicycle 14, the lower portion of coupler 20 is engaged with the lower portion of receiver 16.

Coupler 20 is preferably dimensioned to correspond with the height and width of receiver 16. By lifting bicycle tow bar 24 and the front of towed bicycle 14, coupler 20 is tilted relative to receiver 16 and slid down over receiver 16 until angled coupling ears 52 of coupler 20 bottom out on protruding corresponding ears 54 of receiver 16. When towed bicycle 14 is lowered, the weight of towed bicycle 14 will tend to pull the bottom of coupler 20 away from receiver 16 and push the top of coupler 20 into receiver 16. Angular coupling ears 52 on coupler 20 and protruding corresponding ears 54 on receiver 16 will lock together mating coupler 20 and receiver 16 and holding front wheel 50 of towed bicycle 14 off the ground. Hole 122 is provided in coupler 20 and hole 124 is provided in receiver 16 through which quick release mechanism 56 is placed to rigidly bind coupler 20 and receiver 16 together.

One or more separate receiver assemblies 5 and fork tube clamp assemblies 9 can be provided so different towed bicycles 14 can be used with bicycle tow bar 24. When this arrangement is used, a separate quick release clamp can be provided to replace bicycle tow bar band clamp bolt 68 and bicycle tow bar band clamp nut 71 so the position of handlebar stabilizer assembly 7 can be quickly and easily adjusted to the specific towed bicycle 14 by moving handlebar stabilizer assembly 7 about and along bicycle tow bar 24 to align handlebar stabilizer assembly 7 with fork tube clamp assembly 9. The quick release clamp can then be tightened to secure handlebar stabilizer assembly 7 to bicycle tow bar 24.

Referring now to FIGS. 22*a*, 22*b* and 22*c*, which are side views of receiver assembly 5 showing angled coupling ears 52 on coupler 20 and protruding corresponding ears 54 on receiver 16 progressively locking together under the weight of towed bicycle 14 in accordance with a first preferred embodiment of the present invention, as bicycle tow bar 24 and towed bicycle 14 are lowered, angled coupling ears 52 on coupler 20 and protruding corresponding ears 54 on receiver 16 lock together under the weight of towed bicycle 14. After coupler 20 and receiver 16 are mated, quick release mechanism 56 is placed in hole 122 in coupler 20 and corresponding hole 124 in receiver 16 to rigidly clamp bicycle tow bar 24 to towed bicycle 14.

Figure 23A:
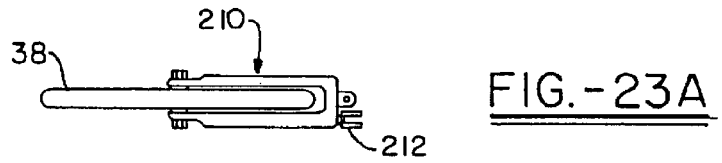
FIGS. 23a, 23b and 23c are a side view of a bicycle towing device in accordance with a second alternate preferred embodiment of the present invention positioned between a tow bicycle and a towed bicycle, a top view of extension tube in an extended position used in conjunction with the same, and a top view of the extension tube in a stored position used in conjunction with the same.
Figure 23B:
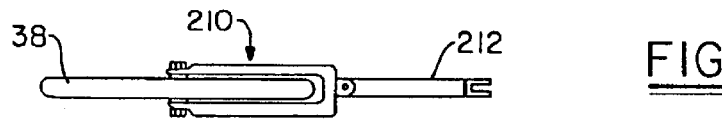
Figure 23C:
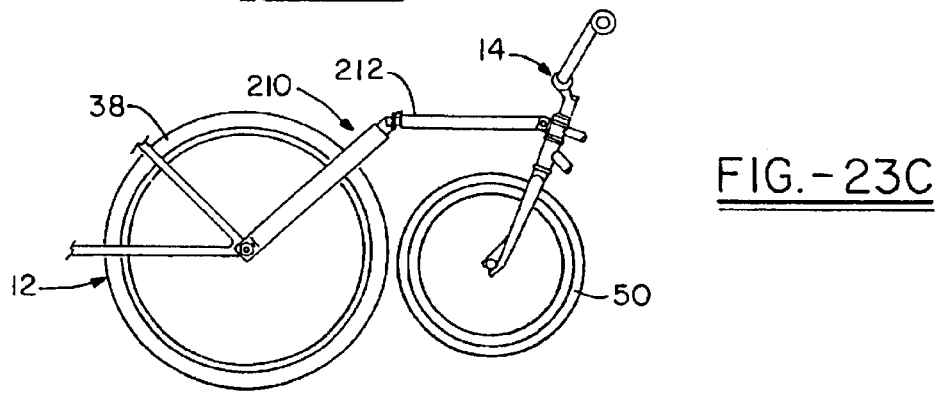

Referring now to FIGS. 23*a*, 23*b* and 23*c*, which show views of a bicycle towing device in accordance with a second alternate perspective embodiment of the present invention, generally identified by reference number 210, positioned between tow bicycle 12 and towed bicycle 14, a side view of extension tube 212 in an extended position used in conjunction with the same and a side view of extension tube 212 in a collapsed position used in conjunction with the same, bicycle towing device 210 includes a large wheel fork which pivots about or near the rear axle of tow bicycle 12. The large wheel fork goes around the rear wheel of tow bicycle 12 and includes extension tube 212 which can be stored inside the large wheel fork by removing the bolt or quick release mechanism and sliding extension tube 212 into the open ended portion of the large wheel fork.

Extension tube 212 and the large wheel fork can be coupled together using, for example, a quick release mechanism by attaching extension tube 212 to the pivot fork provided at the end of the large wheel fork. The axis of the large wheel fork provides the required horizontal pivot and the axis of the pivot fork provides the required vertical pivot. The angle of the pivot fork relative to the large wheel fork should be such that the axis of the pivot fork is of a generally vertical nature. An angle adjusting mechanism for the receiver angle on the fork tube of the towed bicycle 14 is still used and the type used in bicycle towing device 10 can also be used in bicycle towing device 210. The angle at the end of extension tube 212 in bicycle tow device 210 would generally be at a different angle than in bicycle tow device 10, but coupler 20, receiver 16, head tube clamp 128, head tube clamp u-bolts 18, handlebar stabilizer assembly 7 and the angle adjusting arrangements could be the same as that used in bicycle tow device 10 or in any of the following alternative preferred embodiments of bicycle towing device in accordance with the preferred invention.

Figure 24:
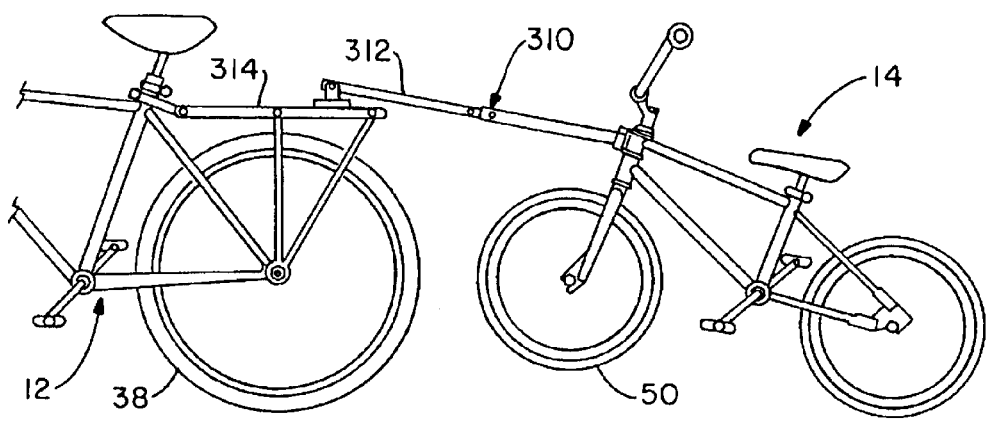
FIG. 24 is a side view of a bicycle towing device in accordance with a third alternate preferred embodiment of the present invention positioned between a tow bicycle and a towed bicycle.

Referring now to FIG. 24, a side view of a bicycle towing device in accordance with a third alternate preferred embodiment of the present invention, generally identified by reference number 310, positioned between tow bicycle 12 and towed bicycle 14 is shown. In bicycle towing device 310, bicycle tow bar 312 is attached to auxiliary frame 314 which is mounted at the rear of tow bicycle 12. A vertical first pivot would be attached to auxiliary frame 314. Another possible arrangement would be to attach bicycle tow bar 312 to the frame of tow bicycle 12 rather than to seat post 74 of tow bicycle 12. For example, bicycle tow bar 312 could be attached to the top of the rear frame stays near seat post 74.

Applicants have found that for towed bicycle 14, or for other one wheeled trailers, to track properly behind tow bicycle 12 when cornering, the first pivots should be as close to horizontal as possible and the second pivots should be as close to vertical as possible when in their operating position. All of the known prior art bicycle trailer arrangements which attach to the seat post of the tow bicycle pivot about an axis which is parallel to the seat post and thus provide for an unstable and less than desirable turning geometry. It has been found to be beneficial to add a firm or adjustable correction to make the pivots substantially vertical and horizontal.

In the first preferred embodiment of bicycle towing device 10, bicycle tow bar 24 collapses by telescoping to a smaller size. There are alternative ways of changing the bicycle tow bar so it can be stored on tow bicycle 12. For example, instead of telescoping bicycle tow bar 24, the bicycle tow bar could have a hinged pivot axis connecting the inner tow bar tube and the outer tow bar tube with a pin for locking the hinged bar in an extended position and a folded position. Alternatively, the extension part of the bicycle tow bar could be removed from the bicycle tow bar and stored elsewhere on tow bicycle 12 such as being clipped under the main horizontal tube on tow bicycle 12. The entire collapsed bicycle tow bar could be removed from its attachment point on tow bicycle 12 by using a quick release mechanism and clipped to some other portion of tow bicycle 12. If auxiliary frame 314 described above is used, the bicycle tow bar could be removed from the auxiliary frame 314 by using a quick release mechanism and clipping it onto auxiliary frame 314.

In the first preferred embodiment of bicycle towing device 10, the telescopic tow bar tubes are constrained in their extended position by using a locking pin as previously described. If a folding bicycle tow bar arrangement is used to collapse the bicycle tow bar, a locking pin can also be used but of a different design than the one used for the telescopic design. If tighter rotational constraint is desired, the bicycle tow bar tubes could be locked together using tapered shims and tapered holes in the bicycle tow bar tubes with a quick release mechanism securing the bicycle tow bar tubes and the tapered shims together. Also engagement teeth can be bonded to the inside of the outer tow bar tube and to the outside of the inner tow bar tube in such a way as to allow the inner tow bar tube to slide into the outer tow bar tube but when rotated and pulled back out would engage the teeth in the two bicycle tow bars. A pin is then inserted to keep the bicycle tow bars from sliding but relative rotation is constrained by the engagement teeth. It will be readily recognized by those having a level of ordinary skill in the pertinent art that other arrangements for locking the bicycle tow bar tubes together could be readily utilized using the teachings of the present invention.

Figure 25A:
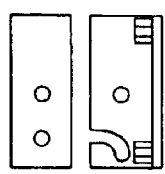
FIGS. 25a, 25b and 25c are side views of alternate coupler and receiver arrangements which could be used in the first preferred embodiment of the present invention positioned between a tow bicycle and a towed bicycle shown in FIG. 1, the second alternate preferred embodiment of the present invention positioned between a tow bicycle and a towed bicycle shown in FIGS. 23a, 23b and 23c and the third alternate preferred embodiment of the present invention positioned between a tow bicycle and a towed bicycle shown in FIG. 24.
Figure 25B:
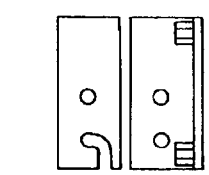
Figure 25C:
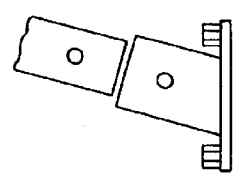

Referring now to FIGS. 25*a*, 25*b* and 25*c*, side views of alternate coupler and receiver arrangements which could be used in the first preferred embodiment of bicycle towing device 10 between tow bicycle 12 and towed bicycle 14, the second preferred embodiment of bicycle towing device 210 between tow bicycle 12 and towed bicycle 14 and the third preferred embodiment of bicycle towing device 310 positioned between tow bicycle 12 and towed bicycle 14 are shown. One significant aspect of the bicycle towing device in accordance with the preferred embodiments of the present invention as described and shown herein is the ease of coupling the bicycle tow bar to towed bicycle 14. However, instead of using coupler 20 and receiver 16 that have matching ears, a pin could be placed through the coupler and a slot put into the receiver so that the pin slides into the slot on the receiver and locks with the coupler when the towed bicycle 14 and the bicycle tow bar are lowered together. Alternatively, a pin could be extended out from each side of the receiver and a slot could be positioned on each side of the coupler. Also, the receiver could be fabricated from two individual substantially 90 degree angled pieces with the coupler being fabricated from a solid piece that engages between the flat parallel sides of the angled pieces. The receiver could be made with a piece of square, round or oval pipe protruding from the front of the receiver. The coupler could then be a matching piece of pipe that slides inside or outside of the receiver pipe.

Another significant aspect of the various preferred embodiments of bicycle towing device in accordance with the present invention as described and shown herein is the ability of the bicycle tow bar to be adjustable for the angle between the bicycle tow bar and head tube 134 of towed bicycle 14. Without such an adjustment capability, the bicycle tow bar might work with some tow bicycle/towed bicycle combinations, but might not work with others due to variations in size and configuration which exist between different bicycles. For example, variations that might effect the operation of the bicycle tow bar include the tow bicycle wheel diameter, the tow bicycle seat post tube angle, the tow bicycle seat post tube length, the tow bicycle seat post tube location relative to the tow bicycle rear axle, the towed bicycle wheel diameter, the towed bicycle head tube angle and the length of the towed bicycle. Since these parameters vary significantly between different bicycles, the angle adjustment capability is beneficial to ensure that the bicycle tow bar can be used on a wide range of bicycles in a safe and proper manner. Ways of accomplishing this angle adjustment include changing the angle of the receiver relative to head tube 134 of towed bicycle 14 which changes the angle of the bicycle tow bar relative to head tube 134 or changing the angle of the coupler relative to the bicycle tow bar which changes the angle of head tube 134 relative to the attached bicycle tow bar.

Multiple holes could be provided on a receiver piece through which a pin could be placed binding the coupler and the receiver together at the desired angle. A mechanism could be provided which provides adjustable stops at the top of the receiver to control the angle at which the coupler hits the receiver stop and thus changing the angle between the coupler and the receiver. A threaded adjustment screw could be provided for easy adjustment in this case. Alternatively, it is possible to make numerous receivers that mate to the head tube and provide different angles and thus the angle adjustment can be accomplished by simply picking a differently angled receiver.

The angled adjustment can be placed on the bicycle tow bar end of the bicycle tow bar instead of the head tube and receiver combination. The particular embodiment of the coupler could be pivoted about a pinned axis and could have multiple other holes through which another pin could be inserted through both the coupler and one of the multiple holes thus changing the angle between the coupler and the bicycle tow bar. With this pinned rotation, a bolt could be attached to the coupler through a threaded hole and rotatably attached to the bicycle tow bar. By turning the bolt the angle between the coupler and the bicycle tow bar can be changed.

Numerous differently angled couplers could be provided which are bolted to the end of the bicycle tow bar. To adjust the angle, a different coupler piece can be selected and bolted to the end of the bicycle tow bar thus changing the angle between the bicycle tow bar and the coupler, which in turn changes the angle between the bicycle tow bar and head tube of the towed bicycle 14.

While the first preferred embodiment of bicycle towing device 10 described and shown herein utilizes fork tube band clamp 28 on fork tube 26 of towed bicycle 14 with handlebar stabilizer bar 64 connecting bicycle tow bar band clamp 70 and fork tube bank clamp 28 to secure the handlebar of towed bicycle 14 in a stationary position, other alternative arrangements for securing the handlebar could be utilized using the teachings of the present invention. For example, instead of handlebar stabilizer bar 64 going from bicycle tow bar band clamp 70 to fork tube band clamp 28, it could go from bicycle tow bar band clamp 70 to a clamp on the handlebar post, to a clamp on the handlebar of towed bicycle 14 or to an attachment on front wheel 50 of towed bicycle 14. Furthermore, instead of the adjustment for handlebar stabilizer bar 64 being to move bicycle tow bar clamp 70 about bicycle tow bar 24, the bicycle tow bar end of the handlebar locking tube could be attached to a permanently attached tab on the bicycle tow bar and the adjustment could be made by providing a mechanism for changing the length of the bicycle tow bar stabilizer bar. A handlebar stabilizing bar could also be attached to the frame of towed bicycle 14 and rotated to engage a clamp on either the handlebar, the handlebar post, the forks or front wheel 50 of towed bicycle 14. In addition, a mechanism could be attached to the handlebar post that rotates down and entraps the top frame bar of towed bicycle 14 on both sides and thus prevents the rotation of the handlebar. Another possible modification would be to manufacture a towed bicycle which would be prepared to couple to the bicycle tow bar by placing a hole in both the fork tube and the internal part of the steering tube so as to allow a pin to be inserted through the fork tube and the steering tube to lock the handlebar in a stationary position.

The first preferred embodiment of bicycle towing device 10 in accordance with the present invention uses round tubing for the bicycle tow bar 24 for esthetic and financial reasons. However, the bicycle tow bars could also be fabricated from round, square, oval or other shaped tubes or bars and still utilize the same telescopic or folding collapsible design. If square or oval tubing is used in the telescopic embodiment of the invention, the geometry of these tubes would not permit complete rotation between the tubes as the round tubes do and a locking pin would still be needed to prevent the tubes from coming apart.

Figure 26A:
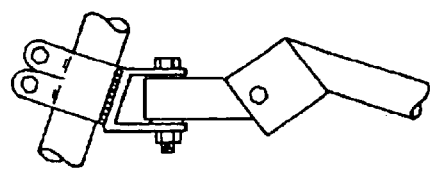
FIGS. 26a, 26b and 26c are side views of a second alternate preferred embodiment of a connection between the tow bicycle seat and the bicycle towing device, a third alternate preferred embodiment of a connection between the tow bicycle seat and the bicycle towing device and a fourth alternate preferred embodiment of a connection between the tow bicycle seat post and the bicycle towing device, respectively.
Figure 26B:
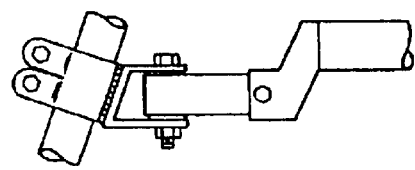
Figure 26C:
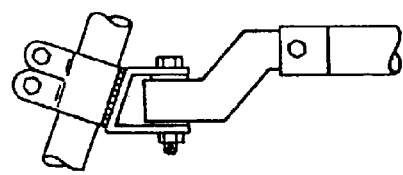

Referring now to FIGS. 26a, 26b and 26c, which show side views of a alternate second preferred embodiment of a connection between the tow bicycle seat post and the bicycle towing device, a third alternate preferred embodiment of the connection between the tow bicycle seat post and the bicycle towing device and a fourth alternate preferred embodiment of the connection between the tow bicycle seat post and the bicycle towing device, in certain instances the clearance between the bicycle tow bar and rear wheel 38 of tow bicycle 38 may be inadequate. If desired, the bicycle tow bar could also be fabricated from straight tubes rather than utilizing curved tubes. As seen in FIG. 26a, if the end of inner telescopic bicycle tow bar tube 44 that connects to second pivot fork 100 is cut at an angle, second pivot fork 100 will angle upwards instead of being directed along the axis of inner telescopic bicycle tow bar tube 44 and will thus provide additional clearance between bicycle tow bar 24 and rear wheel 38 of tow bicycle 12 in both the operational and stored positions. As seen in FIG. 26b, the design of second pivot fork 100 could be changed so instead of being straight, it could come out straight and then angle upwardly for some distance before attaching to inner telescopic bicycle tow bar tube 44 to provide clearance between the bicycle tow bar 24 and rear wheel 38 of tow bicycle 12 in both the operational and stored positions. In addition, as seen in FIG. 26c, the design of pivot block 92 could be changed to come straight out, angle upwardly for a distance and then return to a straight trajectory to provide more clearance between bicycle tow bar 12 and rear wheel 38 of tow bicycle 12 in the operational position but would not provide any additional clearance in the stored position. Another way of providing more distance between rear wheel 38 of tow bicycle 12 and bicycle tow bar 24 is to raise seat post clamp 76 upwardly on seat post 74 of two bicycle 12. However, such an adjustment is constrained by the distance seat post 74 is extended for a particular cyclist and what additional parts, if any, extend from seat post 74 which may interfere with the operation of bicycle tow bar 24.

In the first preferred embodiment of bicycle towing device 10 in accordance with the present invention, friction washers 83 fabricated from a friction reducing material are used to limit the amount of friction produced at first pivot fork 82 and second pivot fork 100 of universal joint assembly 3. While these friction washers 83 would perhaps not be necessary, they are preferred because in order to remove rotation perpendicular to the pivot axes, the axis bolts must be tightened significantly. The use of friction washers 83 results in a significantly smoother and more pleasant operation of bicycle towing device 10. However, one problem that has been experienced with the friction washers 83 is that if a quick release mechanism is used to provide for quick and easy removal of the bicycle tow bar from tow bicycle 12, the bicycle tow bar removal becomes more difficult since friction washers 83 must be inserted and aligned each time the bicycle tow bar is installed on tow bicycle 12. Therefore, in this situation, it may be desirable to have a friction reducing surface that stays on either the pivot block or on fork tube 26 to remedy this disadvantage. One way of accomplishing this is to make a cap that fits over one or both ends of the pivot block and has one hole on each of the four sides of the cap in such a way that when the cap is installed over the end of the pivot block, two of the holes line up with the two holes in the pivot block. When and if the surfaces wear, the cap could be rotated 90 degrees and the other two surfaces could be used to double the effective service life of the cap. Alternatively, friction washers 83 could be bonded to either pivot block 92 or to fork tube 92 so they remain in place when bicycle tow bar 24 is removed from tow bicycle 12. Another possible alternative would be to provide friction washers 83 with clips that hold friction washers 83 in place on either pivot block 92 or on fork tube 26.

Thus, bicycle towing device 10 in accordance with the present invention is designed such that bicycle tow bar 24 can be collapsed and stored on tow bicycle 12 when not being used for towing towed bicycle 14. A small adapter piece is preferably permanently attached to towed bicycle 14 and is designed to mate with the end of bicycle tow bar 24 in such a manner that permits quick and easy attachment of bicycle tow bar 24 to towed bicycle 14 without the use of any tools. Bicycle tow bar 24 is attached to tow bicycle 12 in such a way so as to permit pivoting about two perpendicular axes of a generally vertical and horizontal orientation between tow bicycle 12 and towed bicycle 14. This constrains towed bicycle 14 in such a way as to not allow towed bicycle 14 to tip over or move forward or backward relative to tow bicycle 12 but enables rotation about a generally vertical axis for pivoting during cornering and rotation about a generally horizontal axis for pivoting due to relative elevational changes between tow bicycle 12 and towed bicycle 14. A quick release mechanism can be added at one of the pivot axes if desired to permit quick and easy removal of bicycle tow bar 24 from tow bicycle 12.

Thus, bicycle towing device 10 in accordance with the present invention allows tow bicycle 12 and towed bicycle 14 to begin a bicycle trip with each of the tow bicycle 12 and towed bicycle 14 being ridden independently of each other. When it is desired to attach the towed bicycle 14 to tow bicycle 12, bicycle tow bar 24 can be removed from its stored position, extended and quickly and easily attached to towed bicycle 14. Towed bicycle 14 can then be ridden as a one wheeled bicycle trailer behind tow bicycle 12.

Accordingly, although the present invention has been described above in detail, the same is by way of illustration and example only and is not to be taken as a limitation on the present invention. Accordingly, the scope and content of the present invention are to be defined only by the terms of the appended claims.

What is claimed is:

1. A bicycle towing device for attachment between a tow bicycle having a seat support area, a rear wheel, and a rear wheel axle and a towed bicycle having a front wheel, a handlebar, a head tube and a front wheel fork, the device comprising:

a longitudinally extending tow bar having a first tow bar end and a second tow bar end, wherein the first tow bar end is attached to the seat support area of the tow bicycle and the second tow bar end is removably attachable to the head tube of the towed bicycle;

wherein the tow bar is telescopic having an extended towing position and a retracted storable position;

wherein the front wheel of the towed bicycle remains attached to the front wheel fork and is elevated when the tow bar is attached to the towed bicycle;

wherein the second tow bar end is pivotally moveable about the first tow bar end attached to the seat support area to a storage position adjacent the rear wheel axle on the tow bicycle when the second tow bar end is removed from the towed bicycle such that the tow bar is offset from a radial plane through the rear wheel of the tow bicycle.

2. The bicycle towing device of claim 1, further comprising a storage clip assembly attached near the rear wheel axle of the tow bicycle to retain the second tow bar end in the storage position on the tow bicycle.

3. The bicycle towing device of claim 1, further comprising a handlebar locking bar having a first end and a second end, wherein the first locking bar end is pivotally attached to the tow bar between the first tow bar end and the second tow bar end and the second locking bar end is removably attached to at least one of the handlebar, the front wheel fork, and the front wheel of the towed bicycle to preclude rotational movement of the handlebar of the towed bicycle.

4. The bicycle towing device of claim 3, wherein the locking bar is pivotally moveable about the first locking bar end to a storage position adjacent the tow bar.

5. The bicycle towing device of claim 1 further comprising a pivot block positioned intermediate the tow bar and the tow bicycle to permit relative rotation between the tow bicycle and the towed bicycle about a generally vertical axis for pivoting during cornering and about a generally horizontal axis for pivoting during elevational changes between the tow bicycle and the towed bicycle.

6. The bicycle towing device in accordance with claim 5, wherein the pivot block is attached to the seat support of the tow bicycle by a seat post clamp such that the pivot block is adjustable along the longitudinal axis of the seat post.

7. The bicycle towing device of claim 1, wherein the tow bar is generally longitudinally curved.

8. The bicycle towing device of claim 1, wherein the second tow bar end comprises a coupler which corresponds to and engages with a receiver mounted on the towed bicycle to removably attach the tow bar to the towed bicycle.

9. A bicycle towing device for attachment between a tow bicycle having a seat support area and a rear wheel axle and a towed bicycle having a front wheel, a handlebar, a head tube and a front wheel fork, the device comprising:

a longitudinally extending tow bar having a first tow bar end and a second tow bar end, wherein the first tow bar end is attached to the seat support area of the tow bicycle and the second tow bar end is removably attachable to the head tube of the towed bicycle;

wherein the tow bar is telescopic having an extended towing position and a retracted storable position;

wherein the relative angle between the tow bar and the towed bicycle is adjustably positioned to elevate the front wheel of the towed bicycle wherein the front wheel remains attached to the front fork of the towed bicycle;

a handlebar locking bar having a first end and a second end, wherein the first locking bar end is pivotally attached to the tow bar between the first tow bar end and the second tow bar end and the second locking bar end is removably attached to at least one of the handlebar, the front wheel fork, and the front wheel of the towed bicycle to preclude rotational movement of the handlebars of the towed bicycle wherein the second tow bar end is pivotally moveable about the first tow bar end attached to the seat support area to a storage position adjacent the rear wheel axle on the tow bicycle when the second tow bar end is removed from the towed bicycle.

10. The bicycle towing device of claim 9, further comprising a storage clip assembly attached near the rear wheel axle of the tow bicycle to retain the second tow bar end in the storage position on the tow bicycle.

11. The bicycle towing device of claim 9, wherein the locking bar is pivotally moveable about the first locking bar end to a storage position adjacent the tow bar.

12. The bicycle towing device of claim 9, wherein the attachment of the first locking bar end to the tow bar, the attachment of tow bar to the towed bicycle, and the attachment of the second locking bar end to one of the handlebar, the front wheel fork, and the front wheel, forms a triangle in a generally vertical plane.

13. The bicycle towing device of claim 9 further comprising a pivot block positioned intermediate the tow bar and the tow bicycle to permit relative rotation between the tow bicycle and the towed bicycle about a generally vertical axis for pivoting during cornering and about a generally horizontal axis for pivoting during elevational changes between the tow bicycle and the towed bicycle.

14. The bicycle towing device in accordance with claim 13, wherein the pivot block is attached to the seat support of the tow bicycle by a seat post clamp such that the pivot block is adjustable along the longitudinal axis of the seat post.

15. The bicycle towing device of claim 9, wherein the tow bar is generally longitudinally curved.

16. The bicycle towing device of claim 9, wherein the tow bar is longitudinally adjustable to permit adjustment of the distance between the tow bicycle and the towed bicycle when the bicycle towing device is attached to the tow bicycle and to the towed bicycle.

* * * * *